(12) United States Patent
Richter et al.

(10) Patent No.: US 11,579,104 B2
(45) Date of Patent: *Feb. 14, 2023

(54) PREDICTIVE REFRACTORY PERFORMANCE MEASUREMENT SYSTEM

(71) Applicant: HarbisonWalker International, Inc., Moon Township, PA (US)

(72) Inventors: Tomas Richter, Wexford, PA (US); Corey Forster, Carnegie, PA (US); Donald Abrino, Curwensville, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/549,075

(22) Filed: Dec. 13, 2021

(65) Prior Publication Data
US 2022/0099607 A1   Mar. 31, 2022

Related U.S. Application Data

(63) Continuation of application No. 17/089,005, filed on Nov. 4, 2020, now Pat. No. 11,237,124, which is a
(Continued)

(51) Int. Cl.
*G01N 25/72* (2006.01)
*H04N 5/33* (2023.01)
(Continued)

(52) U.S. Cl.
CPC ............. *G01N 25/72* (2013.01); *G01J 5/12* (2013.01); *G06T 7/0004* (2013.01); *H04N 5/33* (2013.01);
(Continued)

(58) Field of Classification Search
CPC ...... F27D 21/0021; F27D 1/16; F27D 1/1678; F27D 2021/005; F27D 27/00;
(Continued)

(56) References Cited

U.S. PATENT DOCUMENTS 6,922,251 B1   7/2005   Kirchhoff et al.
6,922,252 B2   7/2005   Harvill et al.
(Continued)

FOREIGN PATENT DOCUMENTS

CN   108871210 A   3/2018
CN   208076265 U   4/2018
(Continued)

OTHER PUBLICATIONS

Forrer, M., "Prediction of refractory wear with Machine Learning methods," Institute for Theoretical Computer Science (IGI), Graz University of Technology, Mar. 12, 2012.
(Continued)

*Primary Examiner* — Hoa Q Pham
(74) *Attorney, Agent, or Firm* — Kusner & Jaffe

(57) ABSTRACT

A measurement system is provided for predicting a future status of a refractory lining that is lined over an inner surface of an outer wall of a manufacturing vessel and exposed to an operational cycle during which the refractory lining is exposed to a high-temperature environment for producing a non-metal and the produced non-metal. The system includes one or more laser scanners and a processor. The laser scanners are configured to conduct one or more pre-operational laser scans of the refractory lining prior to the operational cycle to collect data related to pre-operational cycle structural conditions, and one or more post-operational laser scans of the refractory lining after the operational cycle to collect data related to post-operational cycle structural conditions of the refractory lining. The processor is configured to predict future status of the refractory lining after subsequent operational cycles based on the determined exposure impact of the operational cycle.

20 Claims, 6 Drawing Sheets

Related U.S. Application Data continuation-in-part of application No. 16/583,377, filed on Sep. 26, 2019, now Pat. No. 10,859,316.

(51) Int. Cl.
*G06T 7/00* (2017.01)
*G01J 5/12* (2006.01)
*G01J 5/00* (2022.01)
*G01S 13/89* (2006.01)

(52) U.S. Cl.
CPC ....... *G01J 2005/0077* (2013.01); *G01S 13/89* (2013.01); *G06T 2207/10048* (2013.01); *G06T 2207/10072* (2013.01)

(58) Field of Classification Search
CPC .. F27D 21/0014; G01N 21/954; G01N 25/72; G01B 11/24; G01B 11/06; B01B 21/08; G01J 5/12; G06T 7/0004; G06T 2207/10048; G06T 2207/10072; H04N 5/33; C21C 5/441; C21C 5/44; C21C 2005/448
USPC ............. 356/44–45, 237.1–237.5, 600–632; 266/99–100; 348/83
See application file for complete search history.

(56) References Cited

U.S. PATENT DOCUMENTS

| | | | |
|---|---|---|---|
| 7,924,438 B2 | 4/2011 | Kleinloh et al. | |
| 8,072,613 B2 | 12/2011 | Schmitz et al. | |
| 8,958,058 B2 | 2/2015 | Bonin et al. | |
| 9,279,773 B2 | 3/2016 | Harvill | |
| 9,488,601 B2 | 11/2016 | Ruege et al. | |
| 9,880,110 B2 | 1/2018 | Ruege et al. | |
| 10,054,367 B2 | 8/2018 | Bayram et al. | |
| 10,060,725 B2 | 8/2018 | Bonin et al. | |
| 10,175,040 B2 | 1/2019 | Bonin et al. | |
| 11,237,124 B2* | 2/2022 | Richter | F27B 1/28 |
| 11,268,766 B2* | 3/2022 | Picco | F27D 19/00 |
| 2003/0004602 A1 | 1/2003 | Koffron et al. | |
| 2005/0263945 A1 | 12/2005 | Kirchhoff et al. | |
| 2013/0120738 A1 | 5/2013 | Bonin et al. | |
| 2014/0140176 A1 | 5/2014 | Dresen et al. | |
| 2016/0273907 A1 | 9/2016 | Bonin et al. | |
| 2017/0131033 A1 | 5/2017 | Bayram et al. | |
| 2018/0347907 A1 | 12/2018 | Lammer et al. | |
| 2022/0196396 A1* | 6/2022 | Bayram | G01B 15/025 |

FOREIGN PATENT DOCUMENTS

| | | | |
|---|---|---|---|
| DE | 2615202 A1 | 10/1997 | |
| EP | 1 234 193 A1 | 8/2002 | |
| EP | 1 960 734 A2 | 8/2008 | |
| EP | 2 274 573 A2 | 1/2011 | |
| EP | 2 558 816 A1 | 2/2013 | |
| EP | 3 551 951 A1 | 10/2019 | |
| WO | WO-01/38900 A1 | 5/2001 | |
| WO | WO-2007/064928 A2 | 6/2007 | |
| WO | WO-2009/117108 A2 | 9/2009 | |
| WO | WO-2011/119311 A1 | 9/2011 | |
| WO | WO-2016/153643 A1 | 9/2016 | |
| WO | WO-2018/109510 A1 | 6/2018 | |
| WO | WO-2018/141809 A1 | 8/2018 | |

OTHER PUBLICATIONS

Lammer, G., "Advanced Data Mining for Process Optimizations and Use of AI to Predict Refractory Wear and to Analyze Refractory Behavior," AISTech 2017 Proceedings, 2017, pp. 1195, 1197, 1199, 1201, 1203, 1205, 1207.

Viertauer et al, "Refractory Condition Monitoring and Lifetime Prognosis for RH Degasser," Proceedings of the Association for Iron & Steel Technology Conference, Pittsburgh, Pennsylvania, May 6-9, 2019, pp. 1081-1089.

International Search Report and Written Opinion issued in corresponding International Application No. PCT/US2020/051033 dated Nov. 13, 2020.

International Search Report issued in corresponding International Application No. PCT/US2020/062543 dated May 7, 2021.

Written Opinion issued in corresponding International Application No. PCT/US2020/062543 dated May 7, 2021.

Lamar, R., "Laser Measurement System for the Refractory Lining of Hot Torpedo Ladles," (Mar. 15, 2013), retrieved from the Internet: URL:http://www.riegl.com/uploads/tx_pxpriegldownloads/Lacam_Torpedo_in_Iron_Steel_March_2013-736Mar_auth.pdf.

International Preliminary Report on Patentability, Chapter II, issued in corresponding International Patent Application No. PCT/US2020/051033 dated Nov. 19, 2021.

* cited by examiner

PREDICTIVE REFRACTORY PERFORMANCE MEASUREMENT SYSTEM

CROSS-REFERENCE TO RELATED APPLICATIONS

This application is a continuation of U.S. application Ser. No. 17/089,005, filed Nov. 4, 2020, which is a continuation-in-part of U.S. application Ser. No. 16/583,377, filed Sep. 26, 2019, said patent application herein fully incorporated by reference.

FIELD OF THE INVENTION

The present invention relates generally to refractory analysis and, more specifically, a system and method for predicting refractory performance.

BACKGROUND OF THE INVENTION

Industrial processes, such as production of steel and other processes associated with high-temperature erosive environments in manufacturing vessels, are supported by ever-increasing collections of process data and parameters. Many statistical, analytical, and data manipulation solutions can be used to quickly and efficiently analyze process data with the aim of process optimization and improved efficiencies. Process optimization systems, composed of computing system hardware and software, collect the raw process data and correlate the raw process data with changes, modifications, or upgrades to the process. The systems are capable of time stamping and correlating various collected data. In advanced formats, the systems are also capable of analytical and statistical correlations of multiple and interdependent parameters. Using these correlations, the systems can describe the influences on the process efficiencies. Many of the collected process parameters, individually or in correlations, directly influence the performance of the refractory linings.

Such systems, as described above, are used in processes making liquid steel in primary melting units, such as basic oxygen furnaces and electric arc furnaces. The systems can also be used with processes in secondary refining and transport vessels, such as steel ladles, degassers, argon oxygen decarburization, vacuum oxygen decarburization furnaces, or similar. Vessels that contain liquid steel must contain linings constructed from high temperature refractory materials resistant to liquid steel and molten slags. Even so, both liquid steel and molten slags serve to corrode the refractory linings.

In addition, systems as those described above can be used in processes making glass, cement, lime, or other minerals, and in other high temperature units, such as incinerators and others. Further systems can also be used in production and refinement of oils, gasses, chemicals, or similar materials. Vessels utilized in processes that operate at high temperatures, such as continuous and batch glass melters, cement or lime rotary and shaft kilns, or rotary and shaft kilns processing other minerals, or preheat towers and coolers, or various petrochemical reformers, such as primary and secondary ammonia reformers, or fluid catalytic cracking units, or thermal reactors, such as Sulphur recovery units, or gasifies, fluidized beds, incinerators and the like must contain linings constructed from high temperature refractory materials resistant to corrosive and erosive conditions or non-metallic liquids or molten slag or coatings. Even so, all of the above conditions serve to corrode the refractory linings.

The level and the progression of the refractory lining corrosion are conventionally measured by three widely accepted and currently employed methods: visual observation, infrared mapping, and laser scanning. Visual observation of refractory lining corrosion can be performed during servicing of the refractory linings. Visual observation of refractory lining corrosion can also be performed by physical measurement of the refractory lining remnants after completion of the useful life of the refractory lining. The level and the progression of the refractory lining corrosion in glass melters can also be measured by radar detections.

Infrared mapping of refractory lining corrosion is performed on the outside surfaces of the lining-equipped vessels that are loaded with liquid steel, glass, cement, lime, oils, gases, chemicals, or other minerals or materials at a specific step or time at which liquid steel, glass, cement, lime, oils, gases, chemicals, or other minerals or materials are respectively in contact with the vessels. The purpose of infrared mapping of refractory lining corrosion is to correlate the temperature of the outside surfaces of the loaded vessels with the conditions of the refractory linings installed in the vessels. Infrared mapping can be as simple as a visual review of infrared mapping images. Visual review of infrared mapping images can be additionally complemented with software manipulations, advanced temperature imagery, and data reports.

Laser scanning of refractory lining corrosion is performed on inside surfaces of empty, in some cases on full or partially full, lining-equipped vessels at a specific process location. The laser scanning systems can utilize multiple types of hardware and devices therein, including, but not limited to, laser time-of-flight cameras. A software package capable of processing point cloud data into fully geometrically descriptive images and generating various data reports can be used to analyze the data collected from the laser scanning. The purpose of the method is to measure, within an accuracy of 2 mm, an actual geometry, a remaining thickness, or other detailed parameters of the refractory lining. With respect to liquid steel, such parameters may include, but are not limited to, a condition of functional parts of the ladle, such as a well block or a taphole, or a sanding efficiency of the well blocks or tapholes, or measure a steel yield trapped in the depressions of the bottom of the ladle, or conditions of the passages of the flow control components, which may include, but are not limited to, slide gates. With respect to glass, cement, lime, oils, gases, chemicals, or other minerals or materials, such parameters may include, but are not limited to, a condition of functional parts of the respective vessel in contact therewith, such as, but not limited to, entry or exit ports, crowns, roofs, or specific functional sections.

Radar waves can be used for measuring the thickness of the refractory lining in a glass melter during the operation thereof by determining, based on a response of the radar waves, whether the radar waves entered areas having differing densities. The radar measurement is performed from an outer surface of the glass melter.

Conventionally, the four methods described above are utilized independently of each other. The refractory lining corrosion is primarily identified in industrial processes by visual observation. However, infrared mapping, radar scanning, and laser scanning are considered alternate and independent solutions for refractory linings corrosion evaluation. In fact, the four methods compete in the marketplace at significantly diverging costs. The costs of visual observation are largely related to overhead. Infrared mapping systems and radar scanning systems, in glass melters, are less costly than laser scanning systems.

However, the use of the methods individually may have drawbacks in certain situations. For example, very infrequent visual observation of refractory lining corrosion does not collaborate with actual conditions of the refractory linings physically described using laser scanning after each heat or process cycle, or, to a lesser extent, infrared mapping. Further, visual observation does not allow for the collection of valuable process optimization data that can be used to calculate predictive performance of the refractory lining.

Infrared mapping of refractory lining corrosion is indirect and judges the conditions of the refractory lining by observation of the outside surfaces. The temperature readings collected by the infrared mapping method are influenced by the flow of heat thru the actual thickness of the lining. However, adversely, the temperature readings are also influenced by the temperature of the liquid steel or the temperature of impregnated lining voids by liquid steel, process liquids, gasses, solids, or molten slag or coatings. Such impregnations are common and could generate false readings using infrared mapping, thereby leading to a premature replacement of a refractory lining at a significant cost.

Laser scanning of refractory lining corrosion is direct and measures the actual conditions and thickness of the refractory lining with high precision. However, laser scanning is incapable of measuring the thickness and conditions of the refractory lining if the refractory lining is coated by slags or coatings at the time of measurement. In other words, liquid steel, or other melts such as glass or molten slags or coatings cannot be present within the ladle or vessel if accurate results from laser scanning are to be desired. Laser scanning in those situations can only measure the actual conditions and thickness of visually exposed parts of the refractory linings, such as glass melter crowns. If a significant flaw in the lining, such as a large crack or insufficient thickness, were covered by the temporary slag coating, the laser scan would generate false reports. The coating could then melt away during operation, thereby exposing the hidden refractory lining flaw to liquid steel or a high temperature process environment involving non-metals. This could lead to a catastrophic breach of the refractory lining.

In addition, radar scanning in glass applications is within an accuracy of 5 mm and lower than the high precision of laser scanning. Further, each point must be measured individually in radar scanning. As such, radar scanning is time consuming. Only so many points—typically not more than 150—can be completed throughout the entire scan of the vessel. Similar to infrared cameras, radar scanning cannot distinguish between the glass melt or glass infiltrations and can give false readings if such infiltrations are behind the refractory lining.

The present invention has been developed to address these and other issues by providing a system by which refractory lining corrosion is identified through both laser scanning and infrared mapping, and possibly, in the case of glass melters, radar scanning. In addition, the present invention provides a system in which process characteristics and variables can be used in addition to the data retrieved by laser scanning, infrared mapping, and radar scanning to predict the future performance of the refractory lining in question.

SUMMARY OF THE INVENTION

In accordance with an embodiment of the present invention, there is provided a measurement system for predicting a future status of a refractory lining that is lined over an inner surface of an outer wall of a manufacturing vessel and exposed to an operational cycle during which the refractory lining is exposed to a high-temperature environment for producing a non-metal and the produced non-metal. The system includes one or more laser scanners and a processor. The laser scanners are configured to conduct one or more pre-operational laser scans of the refractory lining prior to the operational cycle to collect data related to pre-operational cycle structural conditions, and one or more post-operational laser scans of the refractory lining after the operational cycle to collect data related to post-operational cycle structural conditions of the refractory lining. The processor is configured to determine an exposure impact of the operational cycle on the refractory lining by comparing the collected pre-operational cycle structural condition data with the collected post-operational cycle structural condition data, and predict the future status of the refractory lining after one or more subsequent operational cycles based on the determined exposure impact of the operational cycle.

In accordance with another embodiment of the present invention, there is provided a method of predicting a future status of a refractory lining that is lined over an inner surface of an outer wall of a manufacturing vessel and exposed to an operational cycle during which the refractory lining is exposed to a high-temperature environment for producing a non-metal and the produced non-metal. The method includes conducting one or more pre-operational laser scans of the refractory lining prior to the heat, the conducting prior to the operational cycle to collect data related to pre-operational cycle structural condition, conducting one or more post-operational laser scans of the refractory lining after the operational cycle to collect data related to post-operational cycle structural conditions of the refractory lining, determining, via a processor, an exposure impact of the operational cycle on the refractory lining by comparing the collected pre-operational cycle structural condition data with the collected post-operational cycle structural condition data, and predicting, via the processor, the future status of the refractory lining after one or more subsequent operational cycles based on the determined exposure impact of the operational cycle.

These and other advantages will become apparent from the following description of a preferred embodiment taken together with the accompanying drawings and claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
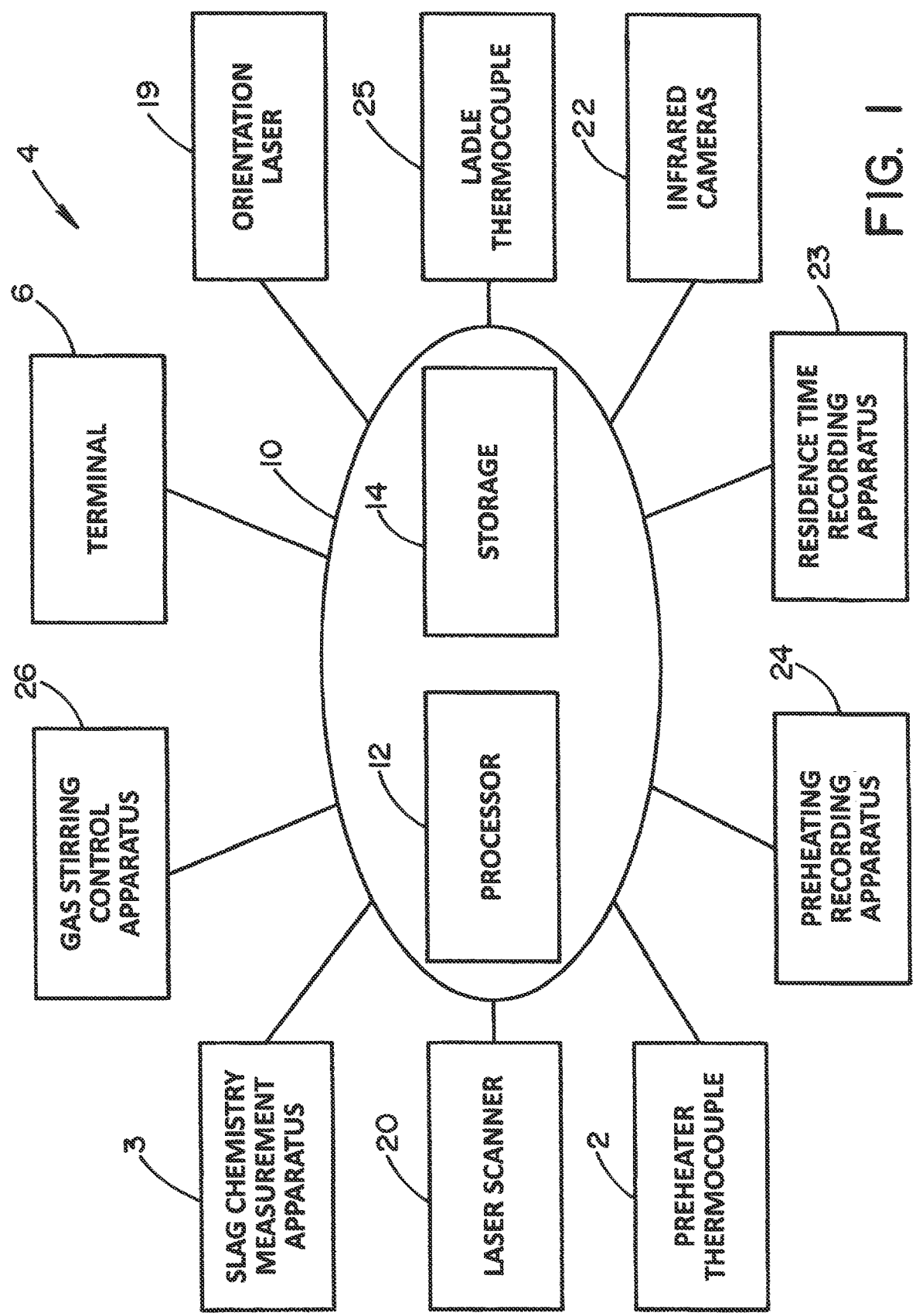
FIG. 1 is a schematic view illustrating a first example predictive refractory performance measurement system of the present invention.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. In addition, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms and are not to be construed as being limited to the examples described herein. Rather, the examples described herein have been provided so that this disclosure will be thorough and complete, and will convey the full scope of the disclosure to one of ordinary skill in the art.

Initially, for purposes of the discussion herein, "metallurgical vessel" refers to any container that can be used within the process for the production or refining of molten steel. This includes, but is not limited to, a primary melting unit or second metallurgical vessels. A primary melting unit includes, but is not limited to, a basic oxygen furnace or an electric arc furnace. Secondary metallurgical vessels include, but are not limited to, a ladle metallurgical furnace, a degasser, an argon oxygen decarburization vessel, or a vacuum oxygen decarburization vessel. An example of a secondary steelmaking or metallurgical vessel that is tasked with carrying molten steel is empty ladle vessel 16 and full ladle vessel 18, which will be described in more detail in the discussion below. However, embodiments described herein are not limited thereto, as the use of a metallurgical vessel is not limited to use with molten steel, but also can hold other molten metals in general.

For purposes of the discussion herein, "manufacturing vessel" refers to any container that can be used within the high temperature process for the production or refining of glass, cement, lime, chemicals, oils and gasses, or other materials typically called as non-metals. This includes, but is not limited to, continuous and batch glass melters, cement or lime rotary and shaft kilns, or rotary and shaft kilns processing other minerals, or preheat towers and coolers, or various petrochemical reformers, such as primary and secondary ammonia reformers, or fluid catalytic cracking units, or thermal reactors, such as sulphur recovery units, or gasifiers, fluidized beds, incinerators and others. However, embodiments described herein are not limited thereto, as the use of a manufacturing vessel is not limited to use with glass, cement, lime, chemicals, oils and gasses, but also can hold or process other non-metals in general.

Further, steel mill operational parameters that influence the performance of refractory linings in metallurgical vessels will be described along with, if applicable, the variability and the measuring methods thereof. For example, for purposes of the discussion herein, a "heat" may refer to one performance of a steel-making process from beginning to end.

In addition, operational parameters that influence the performance of refractory linings in manufacturing vessels will be described along with, if applicable, the variability and the measuring methods thereof. For example, for purposes of the discussion herein, an "operational cycle" may refer to one performance of a manufacturing process from beginning to end. An "operational cycle" may also refer to a time period between shutdowns, a time period between inspections, a time period between maintenance, a time period between repairs, or a time period between laser scans of the manufacturing vessel.

For purposes of the discussion herein, "scrap or charging mix" with respect to the process for the production or refining of molten steel could include batches with specific proportions of individual scrap qualities and iron units for the grade of steel to be produced, including, but not limited to, ferrous scrap identified by guidelines from the Institute of Scrap Recycling Industries, which additionally may include, but is not limited to, heavy melting steel, busheling, clippings, bundles, shreddings, turnings, plates, structures, cast iron, mixed heavy melt, rails, railroad, and can bales, and could be complemented by other sources of iron units, such as, but not limited to, pig iron and hot briquetted iron.

With respect to "scrap or charging mix" in the process for the production or refining of molten steel, there is a large variability of steel scrap qualities and iron units available for the steelmaker to utilize in his primary melting process. Physical attributes of these materials, such as size, shape, and contaminations, chemical attributes of these materials, such as composition, rust, and impurities, and a composition of a "scrap or charging mix" for each heat, have direct impact on the efficiency of the melting process, the duration of the refining metallurgy and the corrosion and erosion of the refractories. The "scrap or charging mix" is typically a simple batching instruction with specific proportions of individual scrap qualities and iron units. These instructions are based on the availability of charging components and grade of steel to be produced.

Further, for purposes of the discussion herein, "charging mix" or "continuously fed mix" with respect to the high temperature process for the production or refining of glass, cement, lime, chemicals, oils and gasses, or other materials typically called as non-metals could respectively include batches or continuous feed with specific proportions of individual raw and starting materials for the grade of the non-metal to be produced.

With respect to "charging mix" or "continuously fed mix" in the high temperature process for the production or refining of glass, cement, lime, chemicals, oils and gasses, or other materials typically called as non-metals, there is a large variability of qualities available for the non-metal maker to utilize in the manufacturing process. Physical attributes of these materials, such as size, shape, and contaminations, along with chemical attributes of these materials, such as composition and impurities, and additionally a composition and frequency of a "charging mix" or "continuously fed mix" for each operational cycle, have direct impact on the efficiency of the manufacturing process, the duration of the operational cycle, and the corrosion and erosion of the refractories. The "charging mix" is typically a simple batching instruction with specific proportions of individual ingredients or additives. The "continuously fed mix" is typically a feeding instruction with specific proportions of individual ingredients or additives. These instructions are based on the availability of charging or continuously fed mix components and grade of non-metal to be produced.

Moreover, for purposes of the discussion herein, "steel" and grades thereof could include, but are not limited to, carbon steels, nickel steels, nickel-chromium steels, molybdenum steels, chromium steels, chromium-vanadium steels, tungsten steels, nickel-chromium-molybdenum steels, and silicon-manganese steels. Further, each grade of steel requires some alternation in the processing of the steel in a primary melting unit, such as, but not limited to, a basic oxygen furnace or an electric arc furnace, and secondary metallurgical vessels, such as, but not limited to, a ladle metallurgical furnace, a degasser, an argon oxygen decarburization vessel, or a vacuum oxygen decarburization vessel. These specific process requirements, aimed at achieving the required steel grade, have a demonstrated effect on refractory lining performance. The amount of residual carbon, the level of impurities and the addition of alloying elements are achieved by decarburization and deoxidation processes, having distinctive corrosion and erosion effect on refractories.

Additionally, for purposes of the discussion herein, "non-metals" and grades thereof could include, but are not limited to, glass compositions such as soda-lime-silicate container or flat glasses, or soda-silicate water glasses, or boro-silicate glasses, or other specialty glasses, or a variety of other glass compositions typically called e-glasses, c-glasses, fiberglass, and the like.

Moreover, for example, the grades of cement clinkers are many and have standardized specifications per ASTM C-150/C-150M-20. The specification lists five types; Type I is the standard product, also referred to as "ordinary cement"; Type II possesses moderate resistance to sulfate attack, also called moderate-heat cement; Type III is high-early-strength cement; Type IV is low-heat cement; and Type V is sulfate-resisting cement with appropriate limits on composition. In addition, ASTM C1157 lists further modification, such as Type GU for general use, type HE for having high early strength, type MS for having moderate sulfate resistance, type HS for having high sulfate resistance, type MH for having moderate heat of hydration, and type LH for having low heat of hydration.

Similarly, the refining products of oil and gasses, or grades of other minerals or chemicals produced within the high temperature environments, have distinctive corrosion and erosion effects on refractories. These specific process requirements, aimed at achieving the required non-metal grade, have a demonstrated effect on refractory lining performance.

Further, for purposes of the discussion herein, "alloying additions" could include "deoxidizers" to furnaces or other metallurgical vessels, such as, but not limited to, aluminum, silicon, ferro-silicon, calcium, magnesium, calcium carbide, and various deoxidizing blends, or additions to ladle manufacturing vessels for secondary steelmaking and refining, such as, but not limited to, carbon, manganese, vanadium, molybdenum, chromium, nickel, titanium, boron, niobium, and other similar materials known to those having ordinary skill in the art.

The process of alloying steel is used to change the chemical composition of steel and alter, adjust, or improve its properties to suit a specification or application. The purpose of deoxidizers is to lower the concentration of oxygen in liquid steels. The additions are added by weight during the melting processes and refining processes, and they differ based on the starting and target parameters of each individual heat. The quantity and quality of these alloying additions have significant effect not only on the quality of the steel, but also on the corrosion of refractory linings.

Still moreover, for purposes of the discussion herein, "slag" with respect to the process for the production or refining of molten steel could include solutions of molten metal oxides and fluorides floating on the top of liquid steel, and could be formed by materials such as, but not limited to, lime, dolomitic lime, and magnesia, which are added prior or during the steel-making and refining processes and are the basis for the creation of slags. Additionally, for purposes of the discussion herein, "flux additions" are added to optimize the fluidity of operating slags, and may include calcium aluminate, fluorspar, silica sand, or various blends of synthetic slags.

"Slags" with respect to the process for the production or refining of molten steel are primarily liquid at the temperatures at which steel making and steel refining take place. They play a role in the steel making process, absorbing non-metallic compounds from the decarburization, deoxidation, desulfurization, and dephosphorization processes. The additions of slag former and fluxes could vary from heat to heat and can be as low as few pounds per ton of steel and as high as several hundred pounds per ton of steel. The quantity and the quality of these additions have a direct influence on the chemical composition of liquid slag and on the corrosion of refractory linings.

The typical chemical composition of the "slags" during the refining processes of molten steel is identified in Table 1. An out-of-balance slag chemical composition has a significant negative impact on the life of a refractory lining. The chemical compositions of a processed cold sample can be measured by, for example, an XRF unit, thereby employing an x-ray fluorescence analytical technique to determine the chemical composition. While not discussed in detail below, a unit that can measure the chemical composition of a processed cold sample will be referred to as slag chemistry measurement apparatus 3.

TABLE 1

| | Ideal Vessel Slag Composition | |
|---|---|---|
| Component | Silicon Killed | Aluminum Killed |
| CaO | 50-60% | 50-60% |
| $SiO_2$ | 25-30% | <8% |
| MgO | 7-10% | 7-10% |
| $Al_2O_3$ | <8% | 25-30% |
| FeO + MnO | <2% | <2% |

Additionally, for purposes of the discussion herein, "coatings" with respect to the high temperature process for the production or refining of glass, cement, lime, chemicals, oils and gasses, or other materials typically called as non-metals could include solutions, or blends of non-metal oxides and fluorides generated in certain conditions during the operational cycle and in certain locations of the manufacturing vessel. The "coatings" adhere to the refractory surface at the temperatures at which non-metal making or refining take place. They could have a direct influence on the corrosion of refractory linings.

The temperature of steel is defined as such prior to tapping (or removal) of the steel from the primary melter, i.e., the furnace vessel, in the range between 2800° F. and 3200° F., or during or near the end of secondary steelmaking in a ladle vessel in the range between 2700° F. and 3000° F. Temperature is usually measured by thermoelectric thermocouples with effectiveness within several degrees ° F., such as ladle thermocouple 25, which are dipped in the molten metal or molten steel and preferably expendable. The application of ladle thermocouple 25 in predictive refractory performance measurement system 4, as well as system 4 itself, will be described in further detail in the following discussion.

The temperature of a manufacturing vessel or the operational cycle with respect to the high temperature process for the production or refining of glass, cement, lime, chemicals, oils and gasses, or other materials typically called as non-metals is between 2000° F. to 3400° F. for glass melters, between 1600° F. to 2700° F. for cement kilns, between 600° F. to 1600° F. for preheat towers, up to 2200° F. for coolers, between 1200° F. to 1400° F. for fluid catalytic cracking units, between 2400° F. to 2800° F. for thermal reactors, up to 2200° F. for ammonia reformers, up to 3000° F. for incinerators, between 2400° F. to 3000° F. for gasifiers, and between 1500° F. to 2200° F. for fluidized beds. Again, temperature is usually measured by thermoelectric thermocouples with effectiveness within several degrees ° F.

Additionally, for purposes of this discussion, a "history" of a metallurgical vessel refers to a period in which the same refractory lining has been lined over the inner surface of the outer wall of the metallurgical vessel. The history is typically recorded through the collection of various "ladle tracking parameters", which include, but are not limited to, heats, plate changes, nozzle changes, and other events that affect metallurgical vessels during the steel-making process in such a way that would affect the life span of refractory linings installed therein. More specifically, the ladle tracking parameters identify when the refractory lining of metallurgical vessel is subjected to repair, change, or demolition.

For example, newly installed working refractory lining of a metallurgical vessel, such as working refractory lining 34, has zero heats and has initial chemical compositions, origins, and physical designs. After service exposure, some of the components of the metallurgical vessel may require change or repair. Examples of such changes could be, but are not limited to a replacement of the flow control slide gate (after as low as 1 heat and as high as 15 heats), a replacement of flow control upper or lower nozzles (after as low as few heat up to 30 heats or higher), a replacement of a gas purging cone, a replacement of a well block and pocket blocks (as low as 15 heats and as high as life of the ladle), and a replacement of the slag line (as low as 15 heats and as high as the life of the unit).

Additionally, for purposes of this discussion, a "history" of a manufacturing vessel with respect to the high temperature process for the production or refining of glass, cement, lime, chemicals, oils and gasses, or other materials typically called as non-metals refers to a period in which the same refractory lining has been lined over the inner surface of the outer wall of the manufacturing vessel. The history is typically recorded through the collection of various "process tracking parameters", which include, but are not limited to, number of operational cycles, number of inspections, number of preventive or acute maintenance stoppages, and other events that affect manufacturing vessels during the non-metal-making process in such a way that would affect the life span of refractory linings installed therein. More specifically, the manufacturing vessel tracking parameters identify when the refractory lining of manufacturing vessel is subjected to repair, change, or demolition.

There are additional repairs possible with respect to the metallurgical vessel, such as, but not limited to, a monolithic patch of a bottom of a ladle vessel and a repair of the ladle vessel lip ring. The ladle vessel at a final demolition thereof could have exposed working refractory lining 34 to as low as a few heats and as high as greater than 200 heats. Variable ladle tracking parameters have significant effects on the overall performance of the refractory lining. The repairs or changes to the metallurgical vessel typically require the vessel to be taken out of service, thereby resulting in thermal shock or thermal gradient damage to the refractory lining positioned therein.

There are also additional repairs possible with respect to the manufacturing vessel used for the high temperature process for the production or refining of glass, cement, lime, chemicals, oils and gasses, or other materials typically called as non-metals. These repairs or changes to the manufacturing vessel typically require the vessel to be taken out of service, thereby resulting in thermal shock or thermal gradient damage to the refractory lining positioned therein.

Still additionally, for purposes of this discussion, "preheating" or "heat up" refers to exposing a metallurgical or a manufacturing vessel to a gas-powered preheater prior to exposure to molten metal or steel with respect to the metallurgical vessel or an operational cycle with respect to the manufacturing vessel. Specifically, with respect to a metallurgical vessel, each empty metallurgical vessel, if in operation, should be kept hot. The preheating or heat up in both metallurgical and manufacturing vessels influences the performance of refractory linings. An example of the preheating that is used in the process for the production or refining of molten steel is working refractory lining 34.

The preheating temperature may be measured by thermocouples. Examples of this method of temperature measurement used in the process for the production or refining of molten steel include preheater thermocouple 2, which is described in further detail below, or optical pyrometers. The preheating temperatures in the process for the production or refining of molten steel are typically in a range of 1500° F. to 2200° F. However, since working refractory linings used in the process for the production or refining of molten steel, such as working refractory lining 34, usually contain graphite and carbon, any non-typical preheating exposure has direct impact on the carbon depletion and consequently on the performance of working refractory lining 34. While necessary, the preheating of working refractory linings used in the process for the production or refining of molten steel, such as working refractory lining 34, predictably shortens the refractory life of the working refractory linings, which impacts the future status of the working refractory linings.

Further, the duration of the preheating or heat up of the metallurgical or manufacturing vessel is not predetermined. Instead, the duration is dependent upon the variables and circumstances defined in the area, or shop, in which the process takes place. Such variables and circumstances may include, but are not limited to, operational inconsistencies, process backlogs, availability of molten metal in the case of the metallurgical vessel, availability of charging or continuously fed mix ingredients or fuels in the case of the manufacturing vessel, unforeseen repairs, or emergency maintenance shutdowns of process equipment. As such, the duration of the preheating or heat up must be monitored by a recording mechanism, such as preheating or heat up recording apparatus 24, which is described in greater detail below.

Moreover, for the purposes of this discussion, "residence time" with respect to the process for the production or refining of molten steel is defined as the cumulative contact time of working refractory lining 34 with molten steel and slags. The residence time is not predetermined and highly depends on the variables and circumstances defined in the area, or shop, in which the process takes place. For example, the process flow of the steel mill can affect the cumulative contact time of working refractory lining 34 with molten steel and slags from as low as 30 minutes to as high as 10 hours or more per each heat. As such, the cumulative contact time must be monitored by a recording mechanism, such as residence time recording apparatus 23, which is described in greater detail below.

Additionally, for the purposes of this discussion, "cycle time" with respect to the high temperature process for the production or refining of glass, cement, lime, chemicals, oils and gasses, or other materials typically called as non-metals is defined as the cumulative contact time of refractory lining with high temperature corrosion and erosion environments. The cycle time is not predetermined and highly depends on the variables and circumstances defined in the area, or shop, in which the process takes place. For example, the process flow in non-metal mill can affect the cumulative contact time of refractory lining and as such, the cumulative contact time must be monitored by a recording mechanism, such as cycle time recording apparatus 423, which is described in greater detail below.

Further, specifically with respect to the process for the production or refining of molten steel, metallurgical vessels are typically equipped with stirring elements located in the bottom thereof. They purge inert gas, such as argon or nitrogen, thru molten steel. The main purpose of this is to improve and accelerate desulfurization of the molten steel, but also to improve alloying efficiency and temperature homogenization of the molten steel. The stirring pressure is typically in the range of 120 psi to 180 psi, and the gas volume is typically between 5-50 scfm. The normal flow volumes are typically 5-10 scfm for a gentle stir and rinse, 15-25 scfm for a medium stir during arcing, alloy addition, and homogenization, and 25-45 scfm for heavy desulfurization. Flows vary by vessel size, plug location, and plug conditions. The purging duration during the heat could be in the range of a few minutes to 30 minutes or more. The typical life of the purging plug is between 500 minutes and 2,000 minutes. The stirring pressure, flow, and time influence not only the life of the plug, but localized erosion of working refractory lining 34. Thus, as is the case with the preheating and the residence time, the parameters related to the stirring of the molten steel are not predetermined, but are dependent on the efficiency of the desulfurization of the steel. For example, the level of sulfur is measured prior to the tapping of the molten steel. If the target of desulfurization is not reached, additional stirring time, increased stirring pressure, and higher flowrate is applied. Increases and elevations in these parameters are known to result in a reduced life span of working refractory lining 34. These parameters can be monitored and recorded in gas stirring control apparatus 26, which will be discussed further below.

In addition, for purposes of this discussion, with respect to the process for the production or refining of molten steel, a physical orientation of a metallurgical vehicle corresponds with the position of the metallurgical vehicle in relationship to an overall space of the area in which the metallurgical vehicle is being used, such as a steel mill or any other facility dedicated to steel generation.

Referring now to the drawings, wherein the showing is for illustrating a preferred embodiment of the invention only and not for limiting same, the invention with respect to the process for the production or refining of molten steel will be described with reference to FIGS. 1-3.

FIG. 1 is a schematic view illustrating an example of predictive refractory performance measurement system 4. System 4 is used to predict the future status, or performance, of refractory linings that are lined over inner surfaces of outer walls of metallurgical vessels for handling molten metal or molten steel. Predictive refractory performance measurement system 4 may be implemented in a mill, foundry, or other environments known by those of ordinary skill in the art to be suitable for the melting, forming, and refining of steel and metal. However, it is contemplated that a substantial portion of system 4 could be implemented in any environment in which surface analysis, temperature analysis, process data analysis, and life expectancy calculation are desired for refractories.

Figure 2:
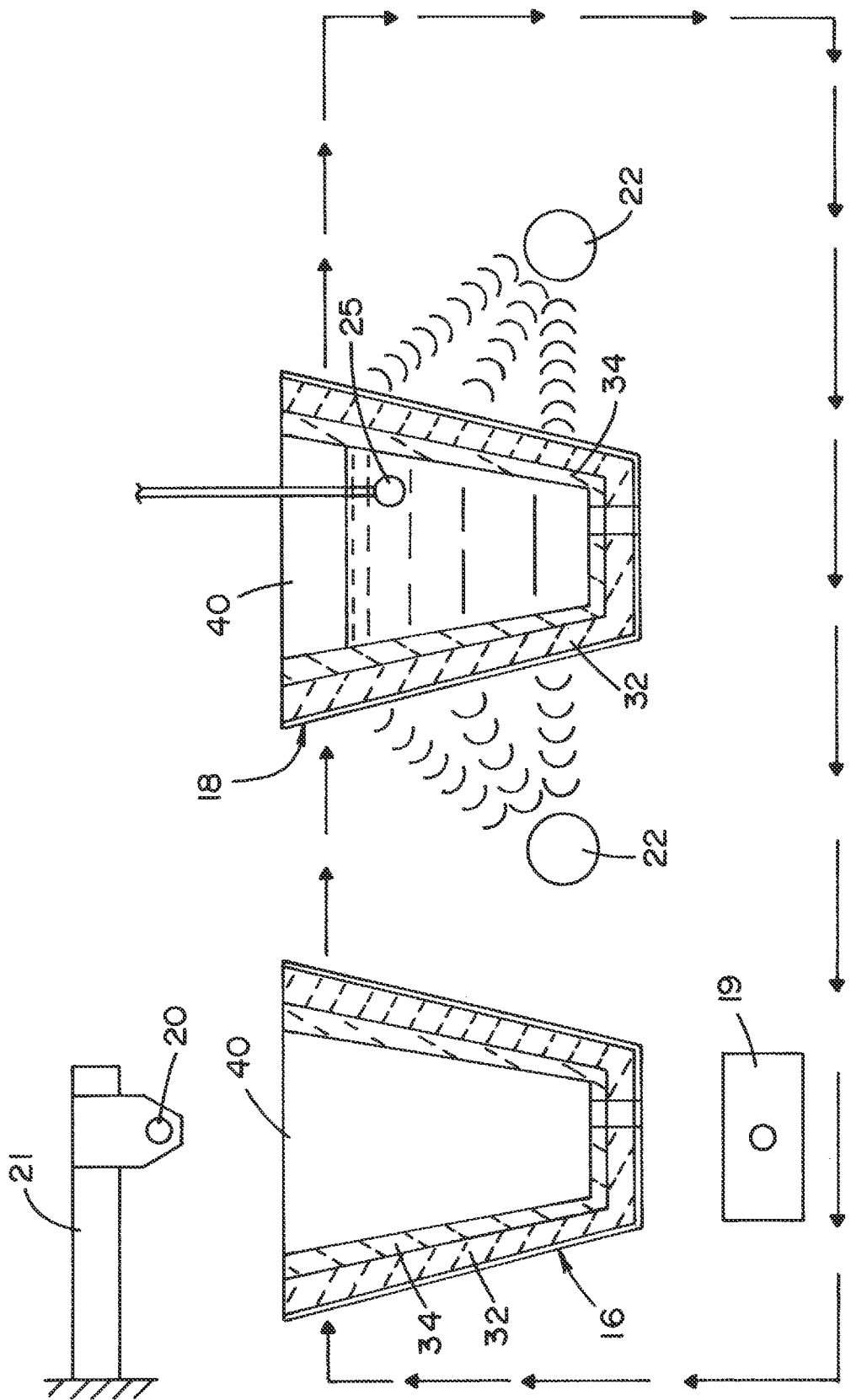
FIG. 2 is a schematic view illustrating a first example of a refractory lining being respectively lined over an inner surface of an outer wall of an empty metallurgical vessel and a full metallurgical vessel for which a future status of the refractory lining is to be predicted by the first example predictive refractory performance measurement system of the present invention.
Figure 3:
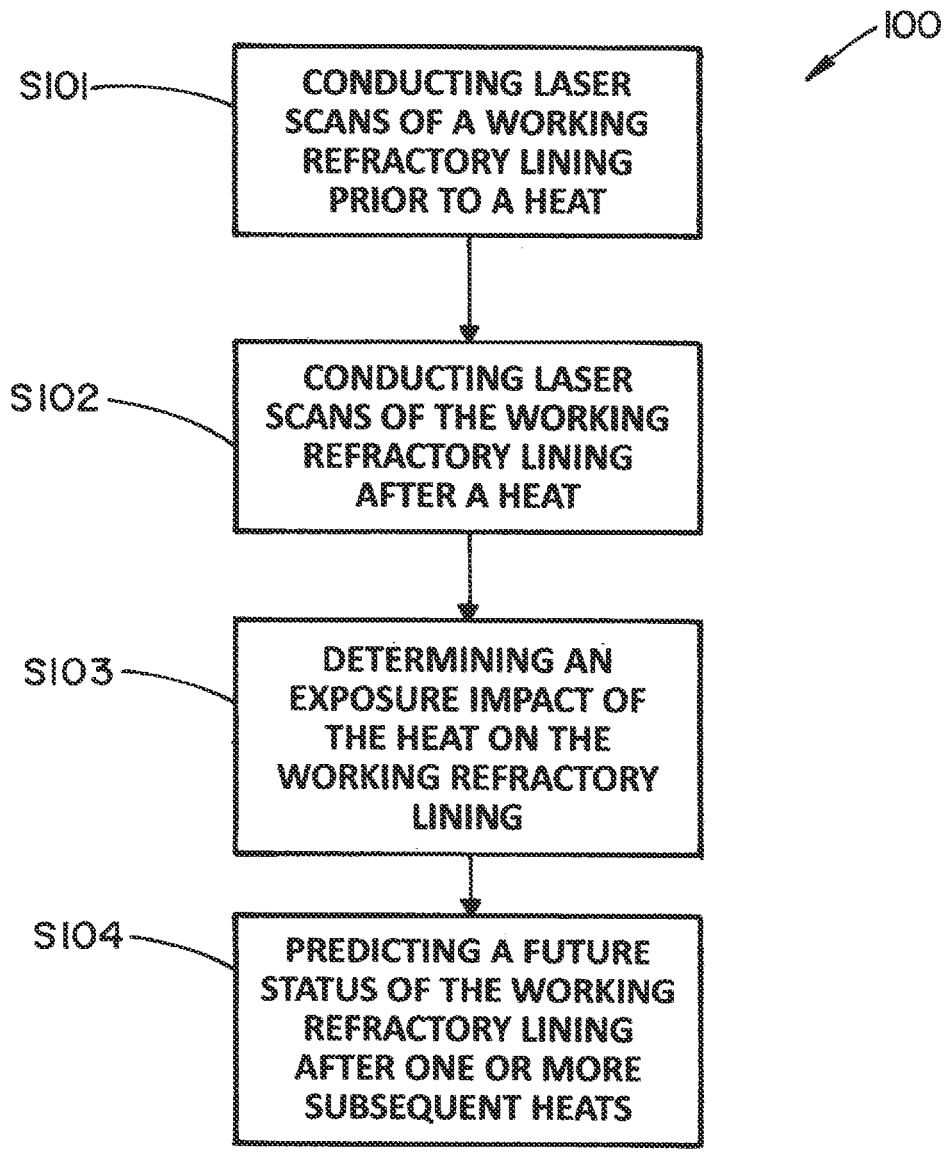
FIG. 3 is a flowchart illustrating a first example method of the present invention of predicting a future status of a refractory lining, where the refractory lining is lined over an inner surface of an outer wall of a ladle vessel and exposed to a heat during which the refractory lining is exposed to molten metal.

The example apparatuses, units, modules, devices, and other components illustrated in FIG. 1 that make up system 4 and perform the method and operations described herein with respect to FIGS. 2 and 3 are implemented by hardware components. Examples of hardware components are not limited to the above-described example apparatuses, units, modules, and devices and may include controllers, sensors, generators, drivers, and any other electronic components known to one of ordinary skill in the art. Such components may be variably located according to design needs and may communicate with each other through wired or wireless means.

In the non-limiting example described herein, system 4 includes computing complex 10. Computing complex 10 may include one or more processors 12 and one or more means of storage 14, but is not limited thereto. Processors 12 and storage 14 of computing complex 10 may be oriented, positioned, or connected in any way to facilitate proper operation of computing complex 10. This includes, but is not limited to, wired configurations, wireless configurations, local configurations, wide area configurations, and any combination thereof in which communication therebetween can be established through compatible network protocol.

Processor 12 is implemented by one or more processing elements. Such processing elements may be as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result.

For simplicity, the singular term "processor" may be used in the description of the example processor 12 described herein, but in other examples multiple processors 12 are used, or processor 12 includes multiple processing elements, or multiple types of processing elements, or both. In one example, system 4 of hardware components includes multiple processors 12 in computing complex 10, and in another example, a hardware component of system 4 includes an independent processor or another controller containing a processor, which then communicates data to receive data from processor 12 of computing complex 10. Processor 12 of computing complex 10 may be defined as a hardware component, along with other components of system 4 discussed below. Similar to processor 12 and other hardware components containing processing functionality may be defined according to any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing. Processor 12 may be connected via cable or wireless network to hardware components to provide instruction thereto or to other processors to enable multiprocessing capabilities.

Instructions or software to control processor 12 or hardware including processors within system 4 to implement the hardware components and perform the methods as described below are written as computer programs, code segments, instructions or any combination thereof, for individually or collectively instructing or configuring processor 12 or hardware including processors within system 4 to operate as a machine or special-purpose computer to perform the operations performed by the hardware components and the methods as described below. In one example, the instructions or software include machine code that is directly executed by processor 12 or hardware including processors within system 4, such as machine code produced by a compiler. In another example, the instructions or software include higher-level code that is executed by processor 12 or hardware including processors within system 4 using an interpreter.

Programmers of ordinary skill in the art can readily write the instructions or software based on the flow chart illustrated in FIG. 3 and the corresponding descriptions herein, which disclose algorithms for performing the operations performed by the hardware components and the methods as described above.

Hardware components implemented in system 4, such as processor 12 or components linked to processor 12, execute instructions or software, such as an operating system (OS) and one or more software applications that run on the OS, to perform the operations described herebelow with respect to FIGS. 2 and 3.

The instructions or software to control processor 12 or hardware including processors within system 4 to implement the hardware components and perform the methods as described below, and any associated data, data files, and data structures, are recorded, stored, or fixed in storage 14. Storage 14 of computing complex 10 generically refers to one or more memories storing instructions or software that are executed by processor 12. However, the hardware components implemented in system 4, such as processor 12 or components linked to processor 12, may include local storage or access, manipulate, process, create, and store data in storage 14 in response to execution of the instructions or software.

Storage 14 may be represented by on one or more non-transitory computer-readable storage media. Storage 14 may be representative of multiple non-transitory computer-readable storage media linked together via a network of computing complex 10. For example, non-transitory computer-readable storage media may be located in one or more storage facilities or one or more data centers positioned remotely from system 4 within computing complex 10. Such a media may be connected to system 4 through a network of computing complex 10. The network of computing complex 10 allows the non-transitory computer-readable storage media remotely located at the data center or the storage facility to transfer data over the network to non-transitory computer-readable storage medium within storage 14 of computing complex 10. In addition, storage 14 may be representative of both remotely and locally positioned non-transitory computer-readable storage media.

Examples of a non-transitory computer-readable storage medium include read-only memory (ROM), random-access memory (RAM), flash memory, solid state memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to processor 12 of computing complex 10 or hardware including processors within system 4 so that processor 12 or processors can execute the instructions. In one example, the instructions or software and any associated data, data files, and data structures are distributed over network-coupled computer systems so that the instructions and software and any associated data, data files, and data structures are stored, accessed, and executed in a distributed fashion by processor 12.

Examples of hardware components in system 4 other than processor 12 and storage 14 of computing complex 10 may include terminal 6. Terminal 6 may include a user input, a display, or a combination thereof, but is not limited thereto. In FIG. 1, terminal 6 is illustrated as being connected to computing complex 10. However, embodiments disclosed herein are not limited thereto. For example, terminal 6 may be connected directly to processor 12, directly to storage 14, to both storage 14 and processor 12, or to any other hardware component of system 4.

Terminal 6 may be configured to display information contained in storage 14 that has been processed by processor 12 or inputted by a user. Processor 12 is in charge of determining what should be displayed on terminal 6. Storage 14 may be configured to store data generated by processor 12 and inputted through terminal 6. Applications, user input, and processor calculations may be stored in storage 14 for access by processor 12 in order to predict refractory performance.

Further examples of the above-referenced hardware in system 4 connected to storage 14 may also include slag chemistry measurement apparatus 3, laser scanner 20, preheater thermocouple 2, infrared cameras 22, residence time recording apparatus 23, preheating recording apparatus 24, gas stirring control apparatus 26, ladle thermocouple 25, and orientation laser 19. Storage 14 may receive data from these hardware components in any wired or wireless manner known to those having ordinary skill in the art and communicate the received and stored data to processor 12 in any wired or wireless manner known to those having ordinary skill in the art for further processing. These operational components will be more particularly described in the discussion below.

FIG. 2 is a schematic view illustrating an example refractory lining being lined over an inner surface of an outer wall of ladle vessels 16 and 18 for which a future status of the refractory lining is to be predicted by predictive refractory performance measurement system 4. Ladle vessel 16 does not contain molten metal or molten steel and, therefore, is referred to as "empty ladle vessel 16". Ladle vessel 18 contains molten metal or molten steel and, therefore, is referred to as "full ladle vessel 18". Ladle vessels 16 and 18 of FIG. 2 are representative of secondary refining and transport vessels, such as steel ladles.

Each of ladle vessels 16 and 18 are lined with the same refractory. In the examples illustrated in FIG. 2, backup refractory lining 32 is lined over an inner surface of an outer wall of ladle vessels 16 and 18. Working refractory lining 34 is lined over backup refractory lining 32.

Since working refractory lining 34 is lined over backup refractory lining 32, backup refractory lining 32 typically has a relatively long life span. For example, backup refractory lining 32 may be able to have a one-year lifespan. On the other hand, during steel-making heats, working refractory lining 34 is directly exposed to the molten metal or molten steel placed within ladle vessels 16 and 18. Thus, working refractory lining 34 typically has a much shorter life span. Depending on the severity of the steel-making processes employed during the heats, working refractory lining 34 may only last for 2 weeks. As such, while working refractory lining 34 of empty ladle vessel 16 is the same as working refractory lining 34 of full ladle vessel 18, it is assumed that, during the heats, working refractory lining 34 of full ladle vessel 18 will be affected by the molten metal or molten steel contained therein. Therefore, the structural condition of working refractory lining 34 in empty ladle vessel 16 prior to a heat being conducted may be significantly different from the structural condition of working refractory lining 34 in empty ladle vessel 16 after each heat is conducted.

As previously noted, system 4 includes at least one laser scanner 20. Laser scanner 20 may be stationary or mobile. Laser scanner 20 is configured to scan working refractory lining 34 of empty ladle vessel 16 before and after the heats of handling molten metal or molten steel. Laser scanner 20 may have a class 1 eye safe laser with the capability to scan with a frequency of 1,000,000 points in a second. Laser scanner 20 may also have a scanning speed of 20 seconds and a 1 to 2 mm accuracy.

Laser scanner 20 is supported by laser support apparatus 21. Laser support apparatus 21 may be a stationary support if laser scanner 20 is stationary or a mobile support if laser scanner 20 is mobile. If laser scanner 20 is mobile, laser support apparatus 21 may be any means of support known by those of ordinary skill in the art to be suitable for moving mobile laser scanner 20. If laser scanner 20 is stationary, laser support apparatus 21 may be any means of fixable support known by those of ordinary skill in the art to be suitable for fixing stationary laser scanner 20.

The functions of scanning performed by laser scanner 20 include, but are not limited to, collecting structural data related to observations of pre- and post-heat structural conditions of working refractory lining 34 in empty ladle vessel 16 respectively before and after heats in which empty ladle vessel 16 is filled with molten metal or molten steel, thereby becoming full ladle vessel 18. This data is provided to computing complex 10 for safekeeping in storage 14 and/or consideration by processor 12 regarding the structural conditions of working refractory lining 34.

System 4 also may include one or more infrared cameras 22 that may conduct one or more infrared scans of an outer surface of the outer wall of full ladle vessel 18 during the heat to collect data related to a temperature of the outer surface of the outer wall of full ladle vessel 18 during the heat.

In one example, infrared cameras 22 may be placed in several locations within the process mill to strategically measure the temperature of the outer surface of the outer wall of full ladle vessel 18 as full ladle vessel 18 moves from a location in which full ladle vessel 18 is filled with the molten steel to secondary steelmaking locations throughout the process mill, including locations in which refining takes place. In another example, infrared cameras 22 may be placed in a location within the process mill to strategically measure the temperature of the outer surface of the outer wall of empty ladle vessel 16 before and after the heats of handling molten metal or molten steel. Thermal discrepancies of empty ladle vessel 16 can be identified even when empty ladle vessel 16 is being preheated. The temperature data collected from infrared cameras 22 can be mapped to identify deteriorating portions of working refractory lining 34 by processor 12.

Infrared cameras 22 may be any infrared camera known to those having ordinary skill in the art to be appropriate to image an outer surface of an outer wall of a metallurgical vessel when charged with molten steel. The temperature data can be provided to computing complex 10 for safekeeping in storage 14 and/or consideration by processor 12 regarding the structural conditions of working refractory lining 34.

While an analysis utilizing ASTM 680-14 or heat transfer calculation software developed for refractory design may be used to calculate the temperature data of empty ladle vessel 16 or full ladle vessel 18 obtained by infrared cameras 22 in view of thermal resistivity and heat fluxes, embodiments disclosed herein are not limited thereto. For example, any software or method of analysis known to one having ordinary skill in the art to be able to calculate such temperature data can be utilized.

Further, the laser scanned data, the temperature data, or a combination thereof communicated to computing complex 10 for consideration by processor 12 can be additionally considered alongside of other measured and predetermined operational parameters stored in storage 14 that are awaiting communication to and consideration by processor 12. The measured operational parameters may be supplied to computer complex 10 for reference by processor 12 through previously discussed hardware means, including, but not limited to, slag chemistry measurement apparatus 3, preheater thermocouple 2, residence time recording apparatus 23, preheating recording apparatus 24, gas stirring control apparatus 26, and ladle thermocouple 25. The predetermined operational parameters may be supplied to computer complex 10 through terminal 6 via user input or historical data previously processed by processor 12 and stored in storage 14 for future reference regarding the future status prediction for working refractory lining 34.

Predetermined operational parameters may include, but are not limited to, historical data related to one or more refractories applied in one or more historical refractory linings lined over inner surfaces of outer walls of historical metallurgical vessels that handled molten metal or molten steel, an initial chemical composition and origin of working refractory lining 34, an initial physical design of working refractory lining 34, a grade of the steel that is desired to be produced during the heat from the molten steel in the metallurgical vessel, physical and chemical attributes and amounts of charging mix components added to the metallurgical vessel during the heat to produce the desired steel grade from the molten steel, physical and chemical attributes and amounts of alloys added to the metallurgical vessel during the heat for secondary steelmaking and refining, physical and chemical attributes and amounts of slag formers added to the molten steel in the metallurgical vessel during the heat to form slags that absorb non-metallic components from the molten steel to produce the desired steel grade from the molten steel, physical and chemical attributes and amounts of flux additives added to the molten steel in the metallurgical vessel to optimize fluidity of the formed slags to produce the desired steel grade from the molten steel, a history of the metallurgical vessel during a period in which working refractory lining 34 has been lined over the liner surface of the outer wall of the metallurgical vessel, or any other relevant predetermined operational parameter identified in a specific metal producing operation.

For purposes of this application, the physical design of working refractory lining 34 may include, but is not limited to, construction details of working refractory lining 34, shapes of refractory components in working refractory lining 34, sizes of refractory components in working refractory lining 34, and combination of refractory components in working refractory lining 34.

Measured operational parameters may include, but are not limited to, a preheating duration during which the metallurgical vessel is empty and being preheated prior to the heat, a residence time defined by the cumulative contact duration during which the molten steel, the slags, or a combination thereof are in contact with working refractory lining 34 during the process to produce the molten steel, an amount of stirring pressure applied by a stirring of the molten steel in the metallurgical vessel, a flow rate of inert gas applied to the molten steel in the metallurgical vessel during the stirring of the molten steel in the metallurgical vessel, a stirring duration during which the molten metal is stirred, or any other relevant measured operational parameter identified in a specific metal producing operation.

Using the above-referenced data, processor 12 may determine an exposure impact that the heat has had on working refractory lining 34 of the metallurgical vessel and predict a future status of working refractory lining 34 after one or more subsequent heats. The exposure impact that the heat has on working refractory lining 34 may be determined by comparing the structural conditions of working refractory lining 34 before the heat with the structural conditions of working refractory lining 34 after the heat. The future status of working refractory lining 34 after one or more subsequent heats is predicted based on the determined exposure impact. In other words, the exposure impact of the initial heat can be used to predict the future status of working refractory lining 34 after a second heat, a third heat, and so on. Processor 12 may consider data from all data sources referenced above, but is not limited to thereto and could conceivably include other data sources not mentioned herein.

In one example, in order to supplement the prediction of the future status of working refractory lining 34, the determination of the exposure impact of working refractory lining 34 may also be supplemented by correlating the collected temperature data from infrared cameras 22 with the structural conditions of working refractory lining 34 before the handling of the molten steel and the structural conditions of working refractory lining 34 after the handling of the molten steel. This may allow the future status to be more accurately predicted.

In another example, in order to supplement the prediction of the future status of working refractory lining 34, the determination of the exposure impact of working refractory lining 34 may also be supplemented by considering, in correlation with the collected structural condition data, an operational impact that one or more of the aforementioned predetermined or measured operational parameters have on the exposure impact of the heat on working refractory lining 34.

In one example, the historical data related to one or more refractories applied in one or more historical refractory linings lined over inner surfaces of outer walls of historical metallurgical vessels that handled molten metal or molten steel may be used to establish historical patterns of exposure impact. Such historical patterns may complement the comparison of the structural conditions of working refractory lining 34 before the handling of the molten metal or molten steel with the structural conditions of working refractory lining 34 after the handling of the molten metal or molten steel, as well as the correlation of the collected temperature data from infrared cameras 22 therewith. Such historical data could be amassed in storage 14 of computer complex 10 after exposure impact determination to enable processor 12 to predict the future status of subsequent working refractory linings after each successive heat with more accuracy.

With respect to the use of the measured operational parameters to assist in determination of the exposure impact, ladle thermocouple 25 can be provided to measure a temperature of the molten metal or molten steel in full ladle vessel 18. In one example, ladle thermocouple 25 may be inserted through aperture 40 of full ladle vessel 18 and into molten steel to measure the temperature of the molten steel during or at the end of the secondary steelmaking process (e.g., the end of the refining process). Ladle thermocouple 25 may provide the measured temperature data to computing complex 10 for considering by processor 12 during the determination of the exposure impact pursuant to the prediction of the future status of working refractory lining 34.

In addition, slag chemistry measurement apparatus 3 may be provided to measure a chemical composition of a slag generated in a metallurgical vessel during the secondary steelmaking process. As previously noted, for measurement of the chemical composition, a sample of the slag must be cooled. Slag chemistry measurement apparatus 3 may be, for example, an XRF unit, thereby employing an x-ray fluorescence analytical technique to determine the chemical composition. Slag chemistry measurement apparatus 3 may provide the measured chemical composition of a slag to computing complex 10 for consideration by processor 12 during the determination of the exposure impact pursuant to the prediction of the future status of working refractory lining 34.

Moreover, preheater thermocouple 2 may be provided to measure a temperature of the metallurgical vessel when the metallurgical vessel is empty and being preheated prior to the metallurgical vessel being filled of the molten metal or molten steel. Preheater thermocouple 2 may provide the measured preheater temperature to computing complex 10 for consideration by processor 12 during the determination of the exposure impact pursuant to the prediction of the future status of working refractory lining 34.

To monitor the residence time duration, a recording mechanism, such as residence time recording apparatus 23 featured herein, may be used to measure the cumulative contact duration during which the molten metal, slags, or a combination thereof are in contact with the refractory lining during a heat.

In addition, to monitor the duration of the preheating, a recording mechanism, such as preheating recording apparatus 24 featured herein, may be used to record the duration of the preheating performed on an empty metallurgical vessel prior to a heat. Specifically, the duration of the preheating could be measured by preheating recording apparatus 24 as being as little as a few minutes and as great as several days. Preheating recording apparatus 24 may be included in a gas-powered preheater, along with an automatic gas shut-off.

Further, a control mechanism, such as gas stirring control apparatus 26, may be used to measure various stirring parameters, including, but not limited to, an amount of stirring pressure applied by a stirring of the molten steel in a full metallurgical vessel, a flow rate of inert gas applied to the molten steel in the full metallurgical vessel during the stirring of the molten steel in the full metallurgical vessel, and a stirring duration during which the molten metal is stirred.

Orientation laser 19 can be provided to scan the empty ladle vessel 16 to identify a physical orientation of the empty ladle vessel 16 prior to the laser scanning of working refractory lining 34 by laser scanner 20. The scanning performed by orientation laser 19 serves to assist and increase the accuracy of the laser scanning of working refractory lining 34 performed by laser scanner 20. The physical orientation of the empty ladle vessel 16 relates to the position of empty ladle vessel 16 with respect to the process or facility in which empty ladle vessel 16 is being used. Orientation laser 19 provides the identified physical orientation of the metallurgical vessel to computing complex 10 for consideration by processor 12 to determine correct positioning of empty ladle vessel 16 for accurate determination of the exposure impact pursuant to the prediction of the future status of working refractory lining 34.

More particularly, data from orientation laser 19 may allow processor 12 to determine thickness measurements from spatial measurements of the surface of working refractory lining 34. Such measurements cannot be derived unless the physical location and orientation of empty ladle vessel 16 is assumed or precisely known. Data from orientation laser 19 may allow processor 12 to precisely know the physical location and orientation of empty ladle vessel 16.

While orientation laser 19 is shown in FIG. 2 to be positioned directly under empty ladle vessel 16, embodiments disclosed herein are not limited thereto. For example, orientation laser 19 can be positioned in any safe and unobstructed placed with a direct visibility of the outer wall of empty ladle vessel 16, so that orientation laser 19 might be positioned to scan the bottom and the lower portion of empty ladle vessel 16. It is also noted that physical orientation identification by orientation laser 19 can be supplemented through the data provided by laser scanner 20 regarding empty ladle vessel 16.

Referring now to FIGS. 2 and 3, method 100 of predicting a future status of working refractory lining 34 that is lined over an inner surface of an outer wall of a metallurgical vessel and exposed to a heat during which the refractory lining is exposed to molten metal or molten steel is described.

For purposes of discussion of method 100, "metallurgical vessel" may refer to a ladle vessel that is exposed to molten metal or molten steel. A ladle vessel in method 100 refers generally to empty ladle vessel 16 and full ladle vessel 18 in situations in which the emptiness or the fullness of the ladle vessel is not at issue. In addition, in one example, empty ladle vessel 16 receives molten steel from a furnace when molten steel is tapped therefrom. As such, empty ladle vessel 16 transitions to full ladle vessel 18 when molten steel is tapped from the furnace into empty ladle vessel 16.

Moreover, while method 100 is not limited to processes in which a metallurgical vessel is transported, it is assumed that, during a heat in method 100, ladle vessels 16 and 18 are transported throughout the process location or mill through transport means known to those having ordinary skill in the art, such as, but not limited to, cranes, conveyors, rails, and bearings. Further, computing complex 10, including processor 12 and any other control unit contained therein, is enabled to control all processes, including, but not limited to, scanning, measuring, transporting, transferring of metals, observing, collecting, determining, predicting, and considering.

A schematic illustration of the transportation of ladle vessel 16 and 18 is illustrated in FIG. 2. Empty ladle vessel 16 and full ladle vessel 18 are illustrated separately. In an example, empty ladle vessel 16 may be initially scanned to identify a physical orientation of empty ladle vessel 16 prior to any scanning of working refractory lining 34. Such an initial scan may be performed by orientation laser 19, which was discussed above. The physical orientation of empty ladle vessel 16 may be taken into account by processor 12 during any further considerations, determinations, and predictions by processor 12 with respect to ladle vessels 16 or 18.

In addition, after physical orientation scanning and prior to any scanning of working refractory lining 34, while empty ladle vessel 16 is being preheated in preparation for a heat, a preheating temperature and a preheating duration during which empty ladle vessel 16 is being preheated prior to the heat may be recorded. The preheating temperature may be measured by preheater thermocouple 2, and the preheating duration may be recorded by preheating recording apparatus 24. The preheating temperature and the preheating duration may be used by processor 12 as measured parameters in considering an operational impact that the operational parameters related to the steelmaking have on the structural conditions of working refractory lining 34 after the handling of the molten metal or molten steel.

Further measurement of operational parameters, such as, but not limited to, a measurement of temperature of the molten metal or molten steel in full ladle vessel 18 by ladle thermocouple 25, a measurement of a chemical composition of a slag in full ladle vessel 18 by slag chemistry measurement apparatus 3, a measurement of the cumulative contact duration during which the molten steel, the slags, or a combination thereof are in contact with working refractory lining 34 during the heat by residence time recording apparatus 23, and a measurement of a variety of stirring parameters by gas stirring control apparatus 26, may be performed during a heat and will be described in detail below. Predetermined operational parameters, as described above, may be provided to computing complex 10 when convenient. However, as has previously been noted and will be described further below, any predetermined operational parameters provided to computing complex 10 will be considered by processor 12 in the determination of the exposure impact on working refractory lining 34.

After any additional preparative steps are completed, prior to a heat, a laser scan of working refractory lining 34 of empty ladle vessel 16 is conducted (S101). The conducting of the laser scan prior to the heat may be performed by laser scanner 20. The conducting of the laser scan prior to the heat may also include the collecting of data related to pre-heat structural conditions of working refractory lining 34.

Then, a heat is performed, during which empty ladle vessel 16 is filled with molten metal or molten steel, thus becoming full ladle vessel 18. This is illustrated in the flow of FIG. 2, where empty ladle vessel 16 is illustrated at one portion of the process and full ladle vessel 18 is illustrated at a later point in the process. During the heat, full ladle vessel 18 is emptied and becomes empty ladle vessel 16, as is illustrated by the flow in FIG. 2.

After the heat is completed, another laser scan of working refractory lining 34 of empty ladle vessel 16 is conducted (S102). Similar to the conducting of the laser scan prior to the heat, the conducting of the laser scan after the heat may be performed by laser scanner 20. Further, the conducting of the laser scan after the heat may also include the collecting of data related to post-heat structural conditions of working refractory lining 34.

After the laser scanning prior to the heat and the laser scanning after the heat, processor 12 determines (S103) an exposure impact of the heat on working refractory lining 34. Processor 12 may determine the exposure impact by comparing the collected pre-heat structural condition data with the collected post-heat structural condition data. After the determination of the exposure impact of the heat, processor 12 predicts (S104) the future status of working refractory lining 34 after one or more subsequent heats based on the determination of the exposure impact of the heat.

This prediction provides information that is crucial to determine whether the ladle vessel can be used again with working refractory lining 34 or if working refractory lining 34 needs replaced. As such, accidents that result in excessive structural damage to the ladle vessel can be avoided, resulting in less down time, greater efficiency, and cost savings.

In one example, during the heat, one or more infrared scans of the outer surface of the outer wall of full ladle vessel 18 may be conducted by infrared cameras 22. The scans enable infrared cameras 22 to collect data related to the temperature of the outer surface detected during the heat. This temperature data may be correlated with the collected structural condition data to more accurately determine the exposure impact and predict the future status.

In another example, the determining of the exposure impact includes considering, in correlation with the collected structural condition data and, optionally, in this particular example, the collected temperature data from the infrared scanning, an operational impact that one or more of the measured or predetermined operational parameters have on working refractory lining 34 during the heat.

The predetermined operational parameters include those predetermined operational parameters previously discussed herein, including, but not limited to, historical data related to one or more refractories applied in one or more historical refractory linings that handled molten metal, an initial chemical composition and origin of working refractory lining 34, an initial design of working refractory lining 34, a grade of steel that is desired to be produced during the heat, physical and chemical attributes and amounts of charging mix components added to full ladle vessel 18 during the heat, physical and chemical attributes and amounts of alloys added to full ladle vessel 18 during the heat, physical and chemical attributes and amounts of slag formers added to full ladle vessel 18 during the heat, physical and chemical attributes and amounts of flux additives added to full ladle vessel 18 during the heat, and a history of ladle vessel 16 and 18 during a period in which working refractory lining 34 has been lined therein.

The measured operational parameters include those measured operational parameters previously discussed herein, including, but not limited to, a preheating temperature during which empty ladle vessel 16 is being preheated prior to the heat measured by preheater thermocouple 2, a preheating duration during which empty ladle vessel 16 is being preheated prior to the heat measured by preheating recording apparatus 24, a measurement of temperature of the molten metal or molten steel in full ladle vessel 18 by ladle thermocouple 25, a measurement of the cumulative contact duration during which the molten steel, the slags, or a combination thereof are in contact with working refractory lining 34 during the heat by residence time recording apparatus 23, and a measurement, by gas stirring control apparatus 26, of a variety of stirring parameters, such as, but not limited to, an amount of stirring pressure applied by a stirring of the molten metal in full ladle vessel 18 during the heat, a flow rate of inert gas applied to the molten metal in full ladle vessel 18 during the stirring, and a stirring duration during which the molten metal is stirred.

Referring now to the drawings, wherein the showing is for illustrating a preferred embodiment of the invention only and not for limiting same, the invention with respect to the high temperature process for the production or refining of glass, cement, lime, chemicals, oils and gasses, or other materials typically called as non-metals will be described with reference to FIGS. 4-6.

Figure 4:
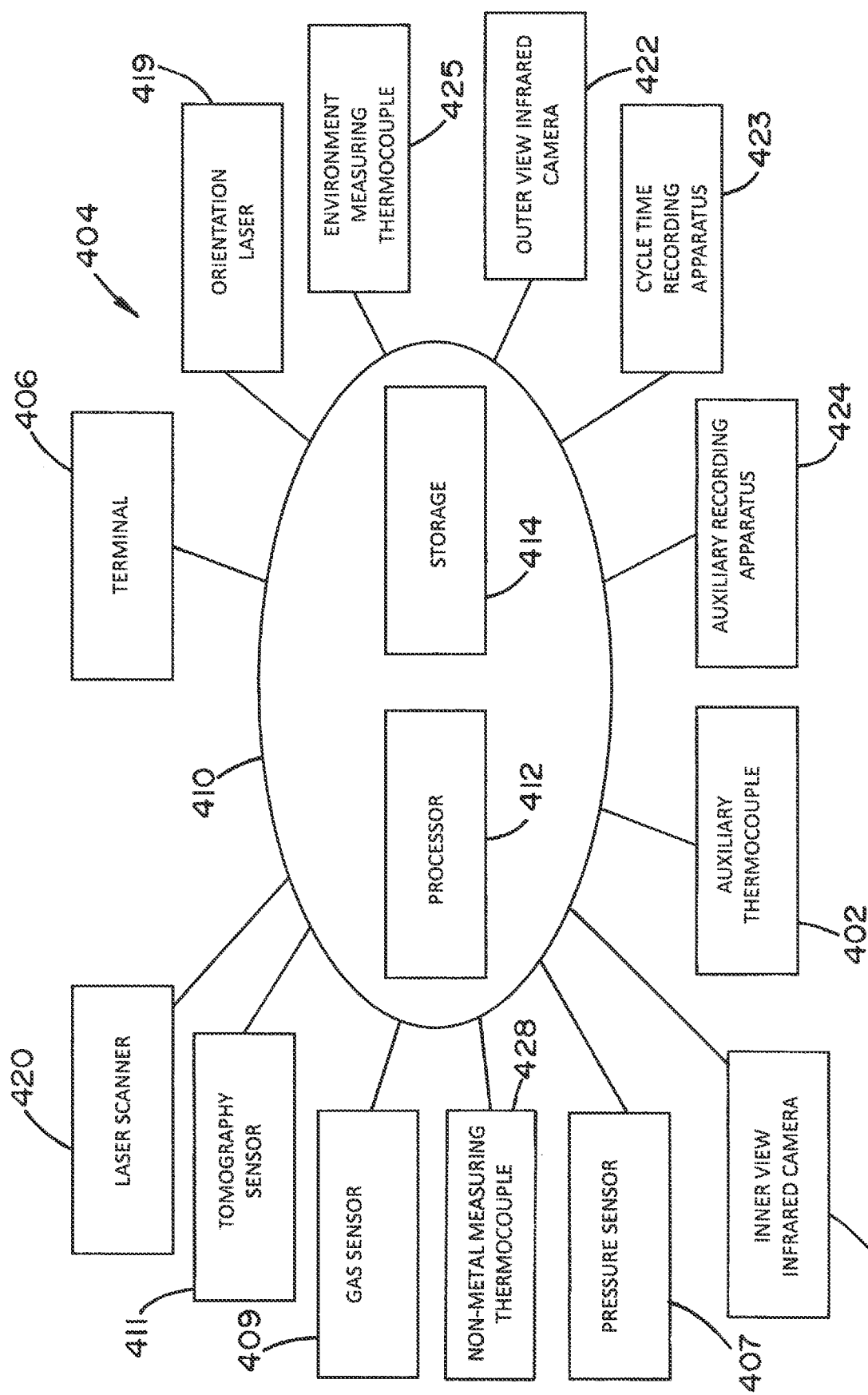
FIG. 4 is a schematic view illustrating a second example predictive refractory performance measurement system of the present invention.

FIG. 4 is a schematic view illustrating another example of a predictive refractory performance measurement system. Predictive refractory performance measurement system 404 is used to predict the future status, or performance, of refractory linings that are lined over inner surfaces of outer walls of manufacturing vessels for handling glass, cement, lime, chemicals, oils and gasses, or other materials typically referred to as non-metals. Predictive refractory performance measurement system 404 may be implemented in a mill, shop, production area, or other environments known by those of ordinary skill in the art to be suitable for the melting, forming, sintering, densifying, converting and refining of non-metal. However, it is contemplated that a substantial portion of system 404 could be implemented in any environment in which surface analysis, temperature analysis, process data analysis, and life expectancy calculation are desired for refractories.

Systems 4 and 404 are similar, in that both systems 4 and 404 are designed to determine the condition of a refractory layer applied in an industrial process after exposure during the industrial process to corrosive material that could serve to cause the refractory layer to deteriorate. While much of the hardware in systems 4 and 404 is interchangeable, certain types of hardware are unique to system 404. In addition, some hardware used in system 4 is not needed for the operation of system 404. Moreover, some of the corresponding hardware of systems 4 and 404 may perform their functions uniquely, as the processes and many of the measured components for which system 4 is used are different from those for which system 404 is used.

Figure 5:
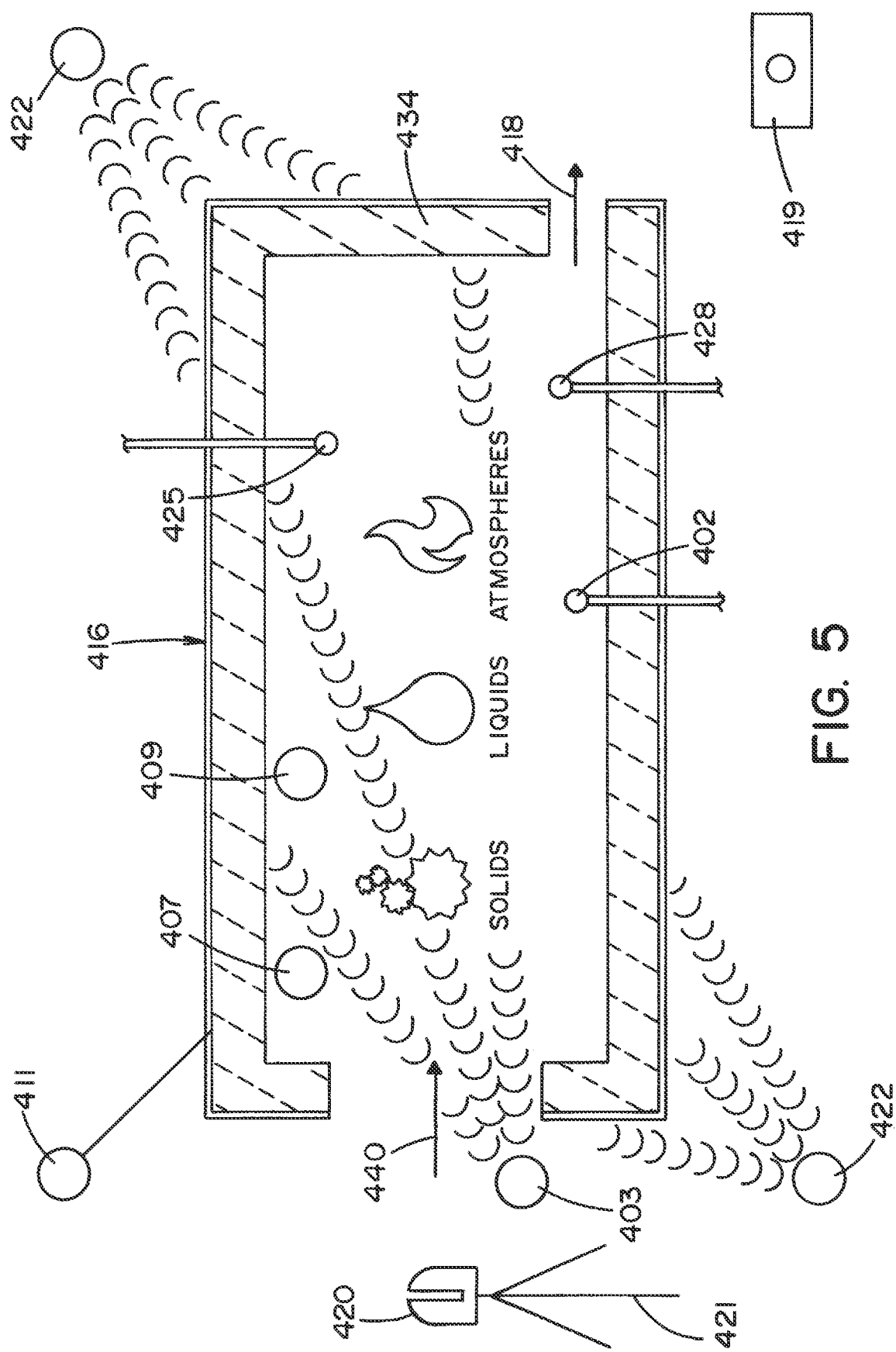
FIG. 5 is a schematic view illustrating an example of a refractory lining being respectively lined over an inner surface of an outer wall of a manufacturing vessel for which a future status of the refractory lining is to be predicted by the second example predictive refractory performance measurement system of the present invention.
Figure 6:
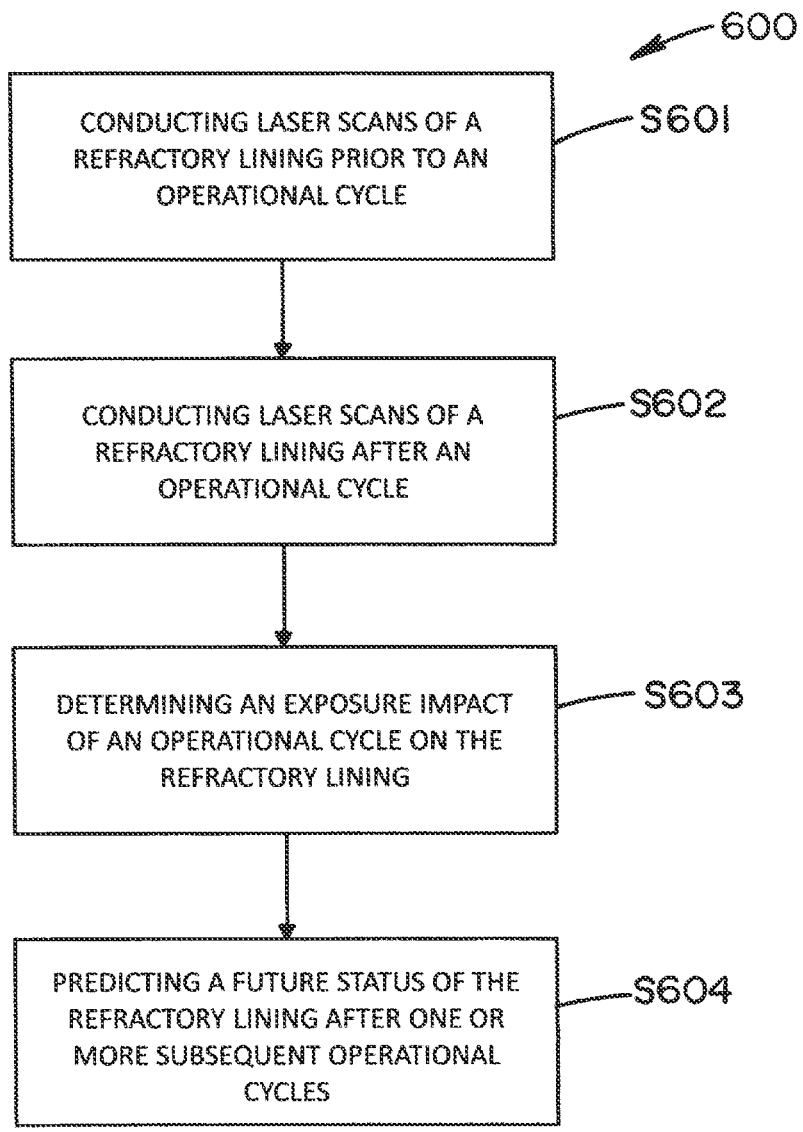
FIG. 6 is a flowchart illustrating a second example method of the present invention of predicting a future status of a refractory lining, where the refractory lining is lined over an inner surface of an outer wall of a manufacturing vessel and exposed to an operation cycle during which the refractory lining is exposed to a high-temperature environment for producing a non-metal.

As is the case with system 4 and FIGS. 1-3, the example apparatuses, units, modules, devices, and other components illustrated in FIG. 4 that make up system 404 and perform the method and operations described herein with respect to FIGS. 5 and 6 are implemented by hardware components. Examples of hardware components are not limited to the above-described example apparatuses, units, modules, and devices and may include controllers, sensors, generators, drivers, and any other electronic components known to one of ordinary skill in the art. Such components may be variably located according to design needs and may communicate with each other through wired or wireless means.

In the non-limiting example described herein, system 404 includes computing complex 410. Computing complex 410 may include one or more processors 412 and one or more means of storage 414, but is not limited thereto. Processors 412 and storage 414 of computing complex 410 may be oriented, positioned, or connected in any way to facilitate proper operation of computing complex 410. This includes, but is not limited to, wired configurations, wireless configurations, local configurations, wide area configurations, and any combination thereof in which communication therebetween can be established through compatible network protocol.

Processor 412 is implemented by one or more processing elements. Such processing elements may be as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result.

For simplicity, the singular term "processor" may be used in the description of the example processor 412 described herein, but in other examples multiple processors 412 are used, or processor 412 includes multiple processing elements, or multiple types of processing elements, or both. In one example, system 404 of hardware components includes multiple processors 412 in computing complex 410, and in another example, a hardware component of system 404 includes an independent processor or another controller containing a processor, which then communicates data to receive data from processor 412 of computing complex 410. Processor 412 of computing complex 410 may be defined as a hardware component, along with other components of system 404 discussed below. Similar to processor 412 and other hardware components containing processing functionality may be defined according to any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing. Processor 412 may be connected via cable or wireless network to hardware components to provide instruction thereto or to other processors to enable multiprocessing capabilities.

Instructions or software to control processor 412 or hardware including processors within system 404 to implement the hardware components and perform the methods as described below are written as computer programs, code segments, instructions or any combination thereof, for individually or collectively instructing or configuring processor 412 or hardware including processors within system 404 to operate as a machine or special-purpose computer to perform the operations performed by the hardware components and the methods as described below. In one example, the instructions or software include machine code that is directly executed by processor 412 or hardware including processors within system 404, such as machine code produced by a compiler. In another example, the instructions or software include higher-level code that is executed by processor 412 or hardware including processors within system 404 using an interpreter.

Programmers of ordinary skill in the art can readily write the instructions or software based on the flow chart illustrated in FIG. 6 and the corresponding descriptions herein with respect to the high temperature process for the production or refining of glass, cement, lime, chemicals, oils and gasses, or other materials typically called as non-metals, which disclose algorithms for performing the operations performed by the hardware components and the methods as described above.

Hardware components implemented in system 404, such as processor 412 or components linked to processor 412, execute instructions or software, such as an operating system (OS) and one or more software applications that run on the OS, to perform the operations described here below with respect to FIGS. 5 and 6.

The instructions or software to control processor 412 or hardware including processors within system 404 to implement the hardware components and perform the methods as described below, and any associated data, data files, and data structures, are recorded, stored, or fixed in storage 414. Storage 414 of computing complex 410 generically refers to one or more memories storing instructions or software that are executed by processor 412. However, the hardware components implemented in system 404, such as processor 412 or components linked to processor 412, may include local storage or access, manipulate, process, create, and store data in storage 414 in response to execution of the instructions or software.

Storage 414 may be represented by on one or more non-transitory computer-readable storage media. Storage 414 may be representative of multiple non-transitory computer-readable storage media linked together via a network of computing complex 410. For example, non-transitory computer-readable storage media may be located in one or more storage facilities or one or more data centers positioned remotely from system 404 within computing complex 410. Such a media may be connected to system 404 through a network of computing complex 410. The network of computing complex 410 allows the non-transitory computer-readable storage media remotely located at the data center or the storage facility to transfer data over the network to non-transitory computer-readable storage medium within storage 414 of computing complex 410. In addition, storage 414 may be representative of both remotely and locally positioned non-transitory computer-readable storage media.

Examples of a non-transitory computer-readable storage medium include read-only memory (ROM), random-access memory (RAM), flash memory, solid state memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to processor 412 of computing complex 410 or hardware including processors within system 404 so that processor 412 or processors can execute the instructions. In one example, the instructions or software and any associated data, data files, and data structures are distributed over network-coupled computer systems so that the instructions and software and any associated data, data files, and data structures are stored, accessed, and executed in a distributed fashion by processor 412.

Examples of hardware components in system 404 other than processor 412 and storage 414 of computing complex 410 may include terminal 406. Terminal 406 may include a user input, a display, or a combination thereof, but is not limited thereto. In FIG. 4, terminal 406 is illustrated as being connected to computing complex 410. However, embodiments disclosed herein are not limited thereto. For example, terminal 406 may be connected directly to processor 412, directly to storage 414, to both storage 414 and processor 412, or to any other hardware component of system 404.

Terminal 406 may be configured to display information contained in storage 414 that has been processed by processor 412 or inputted by a user. Processor 412 oversees determining what should be displayed on terminal 406. Storage 414 may be configured to store data generated by processor 412 and inputted through terminal 406. Applications, user input, and processor calculations may be stored in storage 414 for access by processor 412 in order to predict refractory performance.

Further examples of the above-referenced hardware in system 404 connected to storage 414 are illustrated in at least one of FIG. 4 or 5 and may include, at least one laser scanner 420, auxiliary thermocouple 402, one or more outer view infrared cameras 422, one or more inner view infrared cameras 403, cycle time recording apparatus 423, auxiliary recording apparatus 424, environment measuring thermocouple 425, non-metal measuring thermocouple 428, orientation laser 419, one or more pressure sensors 407, one or more gas sensors 409, and one or more tomography sensors 411 for radar/tomography scanning.

Some of this hardware may only be utilized in certain applications. For example, functional use of tomography sensors 411 for radar/tomography scanning may be limited to applications for radar wave differential measurements in which system 404 is being used to measure refractory layers in glass melters.

Further, functional use of pressure sensors 407 and gas sensors 409 may be limited to petrochemical applications in which system 404 is being employed to measure refractory lining 434 when manufacturing vessel 416 includes burner systems, uses variable fuel feeds, or is under pressure and exposed to the presence of gases. Specifically, pressure measurements taken by pressure sensors 407 and gas-type measurements taken by gas sensors 409 may be communicated to processor 412 for consideration as to how exposure to the pressure and gas makeup within manufacturing vessel 416 impacts a life span of refractory lining 434.

Moreover, functional use of glass pull rate calculator via processor 412 may be further configured to calculate a glass pull rate, which represents the speed at which glass is melted in manufacturing vessel 416 and is usually expressed in the number of tons of glass melted per day. Such calculations may be considered as to how the speed at which the glass is processed in manufacturing vessel 416, i.e., the amount of material passing through the manufacturing vessel 416 a day, impacts a life span of refractory lining 434.

Storage 414 may receive data from these hardware components in any wired or wireless manner known to those having ordinary skill in the art and communicate the received and stored data to processor 412 in any wired or wireless manner known to those having ordinary skill in the art for further processing. These operational components will be more particularly described in the discussion below.

FIG. 5 is a schematic view illustrating an example refractory lining 434 being lined over an inner surface of an outer wall of manufacturing vessel 416 for which a future status of refractory lining 434 is to be predicted by predictive refractory performance measurement system 404. In the examples illustrated in FIG. 5, refractory lining 434 is lined over an inner surface of an outer wall of manufacturing vessel 416.

Depending on the severity of the manufacturing processes employed during the operational cycles, refractory lining 434 may only last for a few months. It is assumed that, during the operational cycles, refractory lining 434 of manufacturing vessel 416 will be affected by molten liquids, or hot, abrasive, and erosive solids, or hot and corrosive gases. Therefore, the structural conditions of refractory lining 434 of manufacturing vessel 416 after each operational cycle may be significantly different from the structural conditions of refractory lining 434 in manufacturing vessel 416 prior to each operational cycle conducted.

As previously noted, system 404 includes at least one laser scanner 420. Laser scanner 420 may be stationary or mobile. Laser scanner 420 is configured to scan refractory lining 434 before and after the operational cycle of handling non-metals. Laser scanner 420 may have a class 1 eye safe laser with the capability to scan with a frequency of 1,000,000 points in a second. Laser scanner 420 may also have a scanning speed of 20 seconds and a 1 to 2 mm accuracy.

Laser scanner 420 is supported by laser support apparatus 421. Laser support apparatus 421 may be a stationary support if laser scanner 420 is stationary or a mobile support if laser scanner 420 is mobile. If laser scanner 420 is mobile, laser support apparatus 421 may be any means of support known by those of ordinary skill in the art to be suitable for moving mobile laser scanner 420. If laser scanner 420 is stationary, laser support apparatus 421 may be any means of fixable support known by those of ordinary skill in the art to be suitable for fixing stationary laser scanner 420.

The functions of scanning performed by laser scanner 420 include, but are not limited to, collecting structural data related to observations of pre- and post-operational cycle structural conditions of refractory lining 434. This data is provided to computing complex 410 for safekeeping in storage 414 and/or consideration by processor 412 regarding the structural conditions of refractory lining 434.

System 404 also may include one or more outer view infrared cameras 422 that may conduct one or more infrared scans of an outer surface of the outer wall of manufacturing vessel 416 during the operational cycle to collect data related to a temperature of the outer surface of the outer wall of manufacturing vessel 416 during the operational cycle. System 404 may further include inner view infrared cameras 403 to conduct one or more infrared scans of an inner surface of the outer wall of manufacturing vessel 416 during the operational cycle to collect data related to a temperature of the inner surface of the outer wall of manufacturing vessel 416 during the operational cycle.

In one example, outer view infrared cameras 422 may be placed in several locations around the outside wall of manufacturing vessel 416 to strategically measure the temperature of the outer surface of the outer wall of manufacturing vessel 416. The thermal reading during the operational cycle and between the operational cycles can be recorded by outer view infrared cameras 422 and analyzed for thermal discrepancies. The temperature data collected from outer view infrared cameras 422 can be then mapped to identify deteriorating portions of refractory lining 434 by processor 412.

In another example, inner view infrared cameras 403 may be placed in locations which would allow for measurement of temperatures of the inner surface of the outer wall of manufacturing vessel 416. Such locations may include, but are not limited to, entry opening 440 of manufacturing vessel 416, exit opening 418 of manufacturing vessel 416, or any other opening in the structure of the manufacturing vessel 416 that would be known by one having ordinary skill in the art to enable inner view infrared cameras 403 to measure the temperatures of the inner surface of the outer wall of manufacturing vessel 416.

Outer view infrared cameras 422 may be any infrared camera known to those having ordinary skill in the art to be appropriate to image an outer surface of an outer wall of manufacturing vessel 416 when a temperature of manufacturing vessel 416 is elevated during the operational cycle. Inner view infrared cameras 403 may be any infrared camera known to those having ordinary skill in the art to be appropriate to image an inner surface of an outer wall of manufacturing vessel 416 when a temperature of manufacturing vessel 416 is elevated during the operational cycle.

The temperature data from outer view infrared cameras 422 and inner view infrared cameras 403 can be provided to computing complex 410 for safekeeping in storage 414 and/or consideration by processor 412 regarding the structural conditions of refractory lining 434. While an analysis utilizing ASTM 680-14 or heat transfer calculation software developed for refractory design may be used to calculate the temperature data obtained by outer view infrared cameras 422 in view of thermal resistivity and heat fluxes, embodiments disclosed herein are not limited thereto. For example, any software or method of analysis known to one having ordinary skill in the art to be able to calculate such temperature data can be utilized.

The temperature readings from inner view infrared cameras 403 during the operational cycle may serve to complement the temperature readings from environment measuring thermocouple 425 or non-metal measuring thermocouple 428.

As previously noted, when manufacturing vessel 416 is a glass melter or a similar vessel used for processing glass, radar/tomography scanning via tomography sensors 411 may be used for measuring thickness of refractory lining 434, detecting incidence of glass impregnation into refractory lining 434 during the operational cycle, or a combination thereof. The radar/tomography measurement via tomography sensors 411 is taken from the outer surface of the outer wall of manufacturing vessel 416. Tomography sensors 411 use radar wave technology to identify the difference in density between the glass being processed during the operational cycle and refractory lining 434.

Further, whether described above or below, the laser scanned data, the temperature data, the radar data, the pressure data, the gas data, the glass pull rate data, or a combination thereof, which is communicated to computing complex 410 for consideration by processor 412, can be additionally considered alongside of other measured and predetermined operational parameters stored in storage 414 that are awaiting communication to and consideration by processor 412. The measured operational parameters may be supplied to computer complex 410 for reference by processor 412 through previously discussed hardware means, including, but not limited to pressure sensors 407, gas sensors 409, auxiliary thermocouple 402, cycle time recording apparatus 423, tomography sensors 411, laser scanner 420, inner view infrared cameras 403, outer view infrared cameras 422, auxiliary recording apparatus 424, environment measuring thermocouple 425, and non-metal measuring thermocouple 428. The predetermined operational parameters may be supplied to computer complex 410 through terminal 406 via user input or historical data previously processed by processor 412 and stored in storage 414 for future reference regarding the future status prediction for refractory lining 434.

Predetermined operational parameters may include, but are not limited to, historical data related to one or more refractories applied in one or more historical refractory linings lined over inner surfaces of outer walls of historical manufacturing vessels that handled non-metals, an initial chemical composition and origin of refractory lining 434, an initial physical design of refractory lining 434, a grade of the non-metal that is desired to be produced during the operational cycle in manufacturing vessel 416, physical and chemical attributes and amounts of charging or continuously fed mix components added to manufacturing vessel 416 during the operational cycle to produce the desired non-metal grade and chemical attributes and amounts of additives, colorants or combustion gases added to manufacturing vessel 416.

For purposes of this application, the physical design of refractory lining 434 may include, but is not limited to, construction details of refractory lining 434, shapes of refractory components in refractory lining 434, sizes of refractory components in refractory lining 434, and combination of refractory components in refractory lining 434.

Additional measured operational parameters may include, but are not limited to, a preheating, heat up, or cool down temperature and duration schedule according which manufacturing vessel 416 is being preheated or heated up prior to the operational cycle or cooled down after the operational cycle. Further measured operational parameters may include a cycle time defined by the cumulative duration of the operational cycle, or any other relevant measured operational parameter identified in a specific non-metal producing operation.

Using the above-referenced data, processor 412 may determine an exposure impact that the operational cycle has had on refractory lining 434 of manufacturing vessel 416 and predict a future status of refractory lining 434 after one or more subsequent operational cycles. The exposure impact that the operational cycle has on refractory lining 434 may be determined by comparing the structural conditions of refractory lining 434 before the operational cycle with the structural conditions of refractory lining 434 after the operational cycle. The future status of refractory lining 434 after one or more subsequent operational cycles is predicted based on the determined exposure impact. In other words, the exposure impact of the initial cycle can be used to predict the future status of refractory lining 434 after a second cycle, a third cycle, and so on. Processor 412 may consider data from all data sources referenced above, but is not limited to thereto and could conceivably include other data sources not mentioned herein.

In one example, in order to supplement the prediction of the future status of refractory lining 434, the determination of the exposure impact of refractory lining 434 may also be supplemented by correlating the collected temperature data from outer view infrared cameras 422 and inner view infrared cameras 403 with the structural conditions of refractory lining 434 before, during, and after each operational cycle. This may allow the future status to be more accurately predicted.

In another example, in order to supplement the prediction of the future status of refractory lining 434, the determination of the exposure impact of refractory lining 434 may also be supplemented by considering, in correlation with the collected structural condition data, an operational impact that one or more of the aforementioned predetermined or measured operational parameters have on the exposure impact of the operation cycle on refractory lining 434.

In one example, the historical data related to one or more refractories applied in one or more historical refractory linings lined over inner surfaces of outer walls of historical manufacturing vessels that produced non-metal may be used to establish historical patterns of exposure impact. Such historical patterns may complement the comparison of the structural conditions of refractory lining 434 before and after the operational cycle of producing non-metal, as well as the correlation of the collected temperature data from outer view infrared cameras 422 and inner view infrared cameras 403 therewith. Such historical data could be amassed in storage 414 of computer complex 410 after exposure impact determination to enable processor 412 to predict the future status of subsequent refractory linings after each successive operational cycle with more accuracy.

With respect to the use of the measured operational parameters to assist in determination of the exposure impact, environment measuring thermocouple 425 can be provided to measure a temperature of the environment within manufacturing vessel 416. Non-metal measuring thermocouple 428 can be provided to measure a temperature of the non-metal being processed within manufacturing vessel 416.

Moreover, auxiliary thermocouple 402 may be provided to measure a temperature of manufacturing vessel 416 when manufacturing vessel 416 is empty and being preheated or heated up prior to manufacturing vessel 416 being filled of the non-metal, or during cooling down of manufacturing vessel 416 at the end of the operational cycle. Auxiliary thermocouple 402, environment measuring thermocouple 425, and non-metal measuring thermocouple 428 may provide the measured temperature to computing complex 410 for consideration by processor 412 during the determination of the exposure impact pursuant to the prediction of the future status of refractory lining 434.

To monitor the cycle time duration, a recording mechanism, such as cycle time recording apparatus 423 featured herein, may be used to measure the cumulative contact duration during which the non-metal, the coatings, or a combination thereof are in contact with refractory lining 434 during an operational cycle.

In addition, to monitor the duration of the preheating, or heat up, or cool down, a recording mechanism, such as auxiliary recording apparatus 424 featured herein, may be used to control and record the duration and temperature of the heating performed on manufacturing vessel 416 prior to an operational cycle, or cooling performed on manufacturing vessel 416 at the end of the operational cycle. Specifically, the duration of the heating or cooling could be measured by auxiliary recording apparatus 424 as being as little as a few hours and as great as several days. Auxiliary recording apparatus 424 may be included in a gas-powered preheater, along with an automatic gas shut-off.

Orientation laser 419 can be provided to scan manufacturing vessel 416 to identify a physical orientation of manufacturing vessel 416 prior to the laser scanning of refractory lining 434 by laser scanner 420. The scanning performed by orientation laser 419 serves to assist and increase the accuracy of the laser scanning of refractory lining 434 performed by laser scanner 420. The physical orientation of manufacturing vessel 416 relates to the position of manufacturing vessel 416 with respect to the process or facility in which manufacturing vessel 416 is being used. Orientation laser 419 provides the identified physical orientation of manufacturing vessel 416 to computing complex 410 for consideration by processor 412 to determine correct positioning of manufacturing vessel 416 for accurate determination of the exposure impact pursuant to the prediction of the future status of refractory lining 434.

More particularly, data from orientation laser 419 may allow processor 412 to determine thickness measurements from spatial measurements of the surface of refractory lining 434. Such measurements cannot be derived unless the physical location and orientation of manufacturing vessel 416 is assumed or precisely known. Data from orientation laser 419 may allow processor 412 to precisely know the physical location and orientation of manufacturing vessel 416.

The orientation laser 419 can be positioned in any safe and unobstructed place with a direct visibility of the outer wall of manufacturing vessel 416, so that orientation laser 419 might be positioned to scan the relevant refractory lined portions of manufacturing vessel 416. It is also noted that physical orientation identification by orientation laser 419 can be supplemented through the data provided by laser scanner 420 regarding manufacturing vessel 416.

Referring now to FIGS. 5 and 6, method 600 of predicting a future status of refractory lining 434 that is lined over an inner surface of an outer wall of manufacturing vessel 416 and exposed to an operational cycle during which refractory lining 434 is exposed to non-metal is described.

For purposes of discussion of method 600, "manufacturing vessel" may refer to a vessel, such as manufacturing vessel 416 that is exposed to non-metal and an environment for processing or producing non-metal. Further, computing complex 410, including processor 412 and any other control unit contained therein, is enabled to control all processes, including, but not limited to, scanning, measuring, transferring materials to and from manufacturing vessel 416, observing, collecting, determining, predicting, and considering.

In an example, manufacturing vessel 416 may be initially scanned by orientation laser 419 to identify a physical orientation of manufacturing vessel 416 prior to any scanning of refractory lining 434 by laser scanners 420. The physical orientation of manufacturing vessel 416 may be taken into account by processor 412 during any further considerations, determinations, and predictions by processor 412 with respect to manufacturing vessel 416.

In addition, after physical orientation scanning and prior to any scanning of refractory lining 434, while manufacturing vessel 416 is being preheated or heated up in preparation for an operation cycle, or cooled down after an operation cycle, a preheating temperature, a heat up temperature, or a cool down temperature, and a duration during which manufacturing vessel 416 is being preheated or heated up prior to the operation cycle or cooled down after the operation cycle may be measured by auxiliary thermocouple 402, and recorded by auxiliary apparatus 424. The temperature data and the preheating duration respectively collected by auxiliary thermocouple 402 and auxiliary apparatus 424 may be used by processor 412 as measured parameters in considering an operational impact that the operational parameters related to the high-temperature environment for producing a non-metal have on the structural conditions of refractory lining 434 after exposure thereto.

Further measurement of operational parameters, such as, but not limited to, a measurement of temperature of the non-metal in manufacturing vessel 416 by non-metal thermocouple 428, a measurement of temperature of the environment in manufacturing vessel 416 by environment measuring thermocouple 425, and a measurement of the cumulative contact duration during which the non-metal and the environment are in contact with refractory lining 434 during the heat by cycle time recording apparatus 423, may be performed during an operational cycle and will be described in detail below. Predetermined operational parameters, as described above, may be provided to computing complex 410 when convenient. However, as has previously been noted and will be described further below, any predetermined operational parameters provided to computing complex 410 will be considered by processor 412 in the determination of the exposure impact on refractory lining 434.

After any additional preparative steps are completed, prior to an operational cycle, a laser scan of refractory lining 434 of manufacturing vessel 416 is conducted (S601). The conducting of the laser scan prior to the operational cycle may be performed by laser scanner 420. The conducting of the laser scan prior to the operational cycle may also include the collecting of data related to pre-operational cycle structural condition of refractory lining 434.

Then, an operational cycle is performed, during which manufacturing vessel 416 is filled with a high-temperature environment for producing a non-metal and, subsequently, a non-metal produced within the high-temperature environment. After the operational cycle is completed, another laser scan of refractory lining 434 of manufacturing vessel 416 is conducted (S602). Similar to the conducting of the laser scan prior to the operational cycle, the conducting of the laser scan after the operational cycle may be performed by laser scanner 420. Further, the conducting of the laser scan after the operational cycle may also include the collecting of data related to post-operational cycle structural conditions of refractory lining 434.

After the laser scanning prior to the operational cycle and the laser scanning after the operational cycle, processor 412 determines (S603) an exposure impact of the operational cycle on refractory lining 434. Processor 412 may determine the exposure impact by comparing the collected pre-operational cycle structural condition data with the collected post-operational cycle structural condition data. After the determination of the exposure impact of the operational cycle, processor 412 predicts (S604) the future status of refractory lining 434 after one or more subsequent operational cycles based on the determination of the exposure impact of the operational cycle.

This prediction provides information that is crucial to determine whether manufacturing vessel 416 can be used again with refractory lining 434 or if refractory lining 434 needs replaced. As such, accidents that result in excessive structural damage to the manufacturing vessel 416 can be avoided, resulting in less down time, greater efficiency, and cost savings.

In one example, during the operational cycle, one or more infrared scans of the outer surface of the outer wall of manufacturing vessel 416 may be conducted by outer view infrared cameras 422. The scans enable outer view infrared cameras 422 to respectively collect data related to the temperature of the outer surface detected during the operational cycle. This temperature data may be correlated with the collected structural condition data to more accurately determine the exposure impact and predict the future status, while also identifying deteriorating portions of refractory lining 434 based on the determined exposure impact.

In another example, the determining of the exposure impact includes considering, in correlation with the collected structural condition data and, optionally, in this particular example, the collected temperature data from the infrared scanning, an operational impact that one or more of the measured or predetermined operational parameters have on refractory lining 434 during the operational cycle.

The predetermined operational parameters include those predetermined operational parameters previously discussed herein, including, but not limited to, historical data related to one or more refractories applied in one or more historical refractory linings exposed to the high-temperature environment and the non-metal, an initial chemical composition and origin of refractory lining 434, an initial design of refractory lining 434, physical and chemical attributes and amounts of charging or continuously fed mix components added to manufacturing vessel 416 during the operational cycle, and a history of manufacturing vessel 416 during a period in which refractory lining 434 has been lined therein.

The measured operational parameters include those measured operational parameters previously discussed herein, including, but not limited to, a preheating, heating or cooling temperature and temperature changes measured by auxiliary thermocouple 402, a duration, during which changes in manufacturing vessel 416 measured by auxiliary thermocouple occurs, measured by auxiliary apparatus 424, a measurement of temperature of the non-metal in manufacturing vessel 416 by non-metal measuring thermocouple 428, a measurement of temperature of the environment in manufacturing vessel 416 by environment measuring thermocouple 425, a measurement of the temperature of the inner surface of refractory lining 434 by inner view infrared cameras 403, a measurement of the cumulative contact duration during which the non-metal and the environment are in contact with refractory lining 434 during the operational cycle by cycle time recording apparatus 423, pressure and gas-type measurements within manufacturing vessel 416 respectively measured by pressure sensors 407 and gas sensors 409, measuring thickness of refractory lining 434 via radar/tomography scanning by tomography sensors 411, and glass pull rate measurements calculated by processor 412.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A measurement apparatus for predicting a future status of a refractory lining that is lined over an inner surface of an outer wall of a manufacturing vessel and exposed to an operational cycle, the apparatus comprising:
   one or more laser scanners configured to conduct:
      one or more pre-operational laser scans of the refractory lining prior to the operational cycle to collect data related to pre-operational cycle structural conditions; and
      one or more post-operational laser scans of the refractory lining after the operational cycle to collect data related to post-operational cycle structural conditions of the refractory lining; and
   a processor configured to:
      determine an exposure impact of the operational cycle on the refractory lining by comparing the collected pre-operational cycle structural condition data with the collected post-operational cycle structural condition data; and predict, the future status of the refractory lining after one or more subsequent operational cycles based on the determined exposure impact of the operational cycle.

2. The apparatus according to claim 1, further comprising:
one or more outer view infrared cameras configured to conduct one or more infrared scans of an outer surface of the outer wall of the manufacturing vessel during the operational cycle to collect temperature data related to a temperature of the outer surface during the operational cycle,
wherein the processor is further configured to determine the exposure impact by correlating the collected temperature data of the outer surface with the collected structural condition data, and
wherein the processor is further configured to map the collected temperature data to identify deteriorating portions of the refractory lining.

3. The apparatus according to claim 1, wherein the processor is further configured to determine the exposure impact by considering, in correlation with the collected structural condition data, an operational impact that one or more operational parameters have on the refractory lining during the operational cycle, and
wherein the operational parameters include one or more predetermined operational parameters selected from the group consisting of:
historical data related to one or more refractories applied in one or more historical refractory linings;
an initial chemical composition and origin of the refractory lining;
an initial refractory lining physical design;
physical and chemical attributes and amounts of charging components or continuously fed mix components added to the manufacturing vessel during the operational cycle; and
a history of the manufacturing vessel during a period in which the refractory lining has been lined over the inner surface of the outer wall of the manufacturing vessel.

4. The apparatus according to claim 3, further comprising:
an auxiliary thermocouple configured to measure a pre-heating, heating up, or cooling down duration during which the manufacturing vessel is being preheated or heated up prior to the operational cycle or cooled down after the operational cycle, the preheating or heating up or cool-down duration being one of the operational parameters.

5. The apparatus according to claim 3, further comprising:
a cycle time recording apparatus configured to measure a cumulative contact duration during the operation cycle in which the refractory lining is exposed to a high-temperature environment, the cumulative contact duration being one of the operational parameters.

6. The apparatus according to claim 3, further comprising:
one or more environment measuring thermocouples configured to measure a temperature of a high-temperature environment in the manufacturing vessel during the operational cycle, the measured high-temperature environment temperature being one of the operational parameters.

7. The apparatus according to claim 1, further comprising:
an orientation laser configured to scan the manufacturing vessel to identify a physical location and orientation of the manufacturing vessel prior to the operational cycle.

8. The apparatus according to claim 1, further comprising:
one or more tomography sensors configured to conduct one or more tomography scans of the manufacturing vessel from the outer surface of the outer wall of the manufacturing vessel during the operation cycle to collect tomography data related to one or more of a thickness of the refractory lining during the operational cycle,
wherein the processor is further configured to determine the exposure impact by correlating the collected tomography data with the collected structural condition data.

9. A method of predicting a future status of a refractory lining that is lined over an inner surface of an outer wall of a manufacturing vessel and exposed to an operational cycle, the method comprising:
conducting one or more pre-operational laser scans of the refractory listing prior to the heat, the conducting prior to the operational cycle to collect data related to pre-operational cycle structural condition:
conducting one or more post-operational laser scans of the refractory lining after the operational cycle to collect data related to post-operational cycle structural conditions of the refractory lining;
determining, via a processor, an exposure impact of the operational cycle on the refractory lining by comparing the collected pre-operational cycle structural condition data with the collected post-operational cycle structural condition data; and
predicting, via the processor, the future status of the refractory lining after one or more subsequent operational cycles based on the determined exposure impact of the operational cycle.

10. The method according to claim 9, further comprising:
conducting one or more infrared scans of an outer surface of the outer wall of the manufacturing vessel during the operational cycle to collect data related to a temperature of the outer surface during the operational cycle,
wherein the determining of the exposure impact further comprises:
correlating the collected temperature data of the outer surface with the collected structural condition data; and
mapping the collected temperature data to identify deteriorating portions of the refractory lining.

11. The method according to claim 9, wherein the determining of the exposure impact further comprises considering, in correlation with the collected structural condition data, an operational impact that one or more operational parameters have on the refractory lining during the operational cycle,
wherein the operational parameters include one or more predetermined operational parameters selected from the group consisting of:
historical data related to one or more refractories applied in one or more historical refractory linings;
an initial chemical composition and origin of the refractory lining;
an initial refractory lining physical design;
physical and chemical attributes and amounts of charging components or continuously fed mix components added to the manufacturing vessel during the operational cycle; and a history of the manufacturing vessel during a period in which the refractory lining has been lined over the inner surface of the outer wall of the manufacturing vessel.

12. The method according to claim 11, further comprising:
   measuring a preheating, heating up, or cooling down, duration during which the manufacturing vessel is being preheated or heated up prior to the operational cycle or cooled down after the operational cycle, the preheating or heating up or cool-down duration being one of the operational parameters.

13. The method according to claim 11, further comprising:
   measuring a cumulative contact duration of the operation cycle in which the refractory lining is exposed to a high-temperature environment, the cumulative contact duration being one of the operational parameters.

14. The method according to claim 11, further comprising:
   measuring a temperature of a high-temperature environment in the manufacturing vessel during the operational cycle, the measured high-temperature environment temperature being one of the operational parameters.

15. The method according to claim 9, further comprising:
   conducting one or more tomography scans of the manufacturing vessel from the outer surface of the outer wall of the manufacturing vessel during the operation cycle to collect tomography data related to one or more of a thickness of the refractory lining during the operational cycle,
   wherein the determining of the exposure impact further comprises correlating the collected tomography data with the collected structural condition data.

16. A measurement apparatus for predicting a future status of a refractory lining that is lined over an inner surface of an outer wall of a manufacturing vessel and exposed to an operational cycle, the apparatus comprising:
   one or more laser scanners configured to collect data related to pre-operational cycle structural conditions of the refractory lining prior to the operational cycle and post-operational cycle structural conditions of the refractory lining after the operational cycle; and
   a processor configured to:
      determine an exposure impact of the operational cycle on the refractory lining by comparing the collected pre-operational cycle structural condition data with the collected post-operational cycle structural condition data; and
      predict the future status of the refractory lining after one or more subsequent operational cycles based on the determined exposure impact of the operational cycle.

17. The apparatus according to claim 16, further comprising:
   one or more infrared cameras configured to, during the operational cycle, collect temperature data related to an outer surface of the outer wall; and
   wherein the processor is further configured to determine the exposure impact by correlating the collected temperature data of the outer surface with the collected structural condition data, and
   wherein the processor is further configured to map the collected temperature data to identify deteriorating portions of the refractory lining.

18. A measurement apparatus for predicting a future status of a refractory lining that is lined over an inner surface of an outer wall of a manufacturing vessel and exposed to an operational cycle, the apparatus comprising:
   laser scanning means for collecting data related to pre-operational cycle structural conditions of the refractory lining prior to the operational cycle and post-operational cycle structural conditions of the refractory lining after the operational cycle; and
   processing means for:
      determining an exposure impact of the operational cycle on the refractory lining by comparing the collected pre-operational cycle structural condition data with the collected post-operational cycle structural condition data; and
      predicting the future status of the refractory lining after one or more subsequent operational cycles based on the determined exposure impact of the operational cycle.

19. A measurement apparatus for predicting a future status of a refractory lining that is lined over an inner surface of an outer wall of a manufacturing vessel and exposed to an operational cycle, the apparatus comprising:
   means for collecting structural condition data related to pre-operational cycle structural conditions of the refractory lining prior to the operational cycle and post-operational cycle structural conditions of the refractory lining after the operational cycle;
   means for determining an exposure impact of the operational cycle on the refractory lining by comparing the collected pre-operational cycle structural condition data with the collected post-operational cycle structural condition data; and
   means for predicting the future status of the refractory lining after one or more subsequent operational cycles based on the determined exposure impact of the operational cycle.

20. A method of predicting a future status of a refractory lining that is lined over an inner surface of an outer wall of a manufacturing vessel and exposed to an operational cycle, the method comprising:
   collecting structural condition data related to pre-operational cycle structural conditions of the refractory lining prior to the operational cycle and post--operational cycle structural conditions of the refractory lining after the operational cycle;
   determining, via a processor, an exposure impact of the operational cycle on the refractory lining by comparing the collected pre-operational cycle structural condition data with the collected post-operational cycle structural condition data; and
   predicting, via the processor the future status of the refractory lining after one or more subsequent operational cycles based on the determined exposure impact of the operational cycle.

* * * * *